(12) United States Patent
Bandyopadhyay et al.

(10) Patent No.: US 9,521,247 B2
(45) Date of Patent: *Dec. 13, 2016

(54) ABOVE-LOCK CAMERA ACCESS

(71) Applicant: Microsoft Technology Licensing, LLC, Redmond, WA (US)

(72) Inventors: Shamik Bandyopadhyay, Lake Stevens, WA (US); Donald A. Barnett, Monroe, WA (US); Vikram Kapoor, Redmond, WA (US); Veronica Y. Law, Seattle, WA (US); Kathryn C. Lemson, Redmond, WA (US); Tirthankar Sengupta, Redmond, WA (US); Divya Tyamagundlu, Bellevue, WA (US); Ahmad Bilal, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/339,060

(22) Filed: Jul. 23, 2014

(65) Prior Publication Data
US 2015/0050916 A1 Feb. 19, 2015

Related U.S. Application Data

(63) Continuation of application No. 12/940,913, filed on Nov. 5, 2010, now Pat. No. 8,811,948.
(Continued)

(51) Int. Cl.
*H04W 12/06* (2009.01)
*H04M 1/725* (2006.01)
(Continued)

(52) U.S. Cl.
CPC ........ *H04M 1/72577* (2013.01); *G06F 1/1643* (2013.01); *G06F 1/1686* (2013.01);
(Continued)

(58) Field of Classification Search
CPC . H04W 12/06; H04M 1/72577; G06F 1/1643; G06F 1/686; G06F 1/3203; G06F 3/016; G06F 3/0481; G06F 3/0488; G06F 21/31; G06F 5/232; G06F 2221/2149
(Continued)

(56) References Cited

U.S. PATENT DOCUMENTS 6,222,909 B1 * 4/2001 Qua et al. ................. 379/88.22
6,662,026 B1 12/2003 Cordray et al.
(Continued)

FOREIGN PATENT DOCUMENTS

CN 101551727 A 10/2009
CN 101739205 A 6/2010
(Continued)

OTHER PUBLICATIONS

Andrew, et al., "Investigating the Use of Voice and Ink for Mobile Micronote Capture", In Proceedings of the 12th IFIP TC 13 International Conference on Human-Computer Interaction: Part I, vol. 5726, Aug. 26, 2009, pp. 782-795.
(Continued)

*Primary Examiner* — Nathan Taylor
(74) *Attorney, Agent, or Firm* — Bryan Webster; Dan Choi; Micky Minhas

(57) ABSTRACT

Apparatus and methods are disclosed for allowing smart phone users to "capture the moment" by allowing easy access to a camera application when a mobile device is in an above-lock (or locked) mode, while also preventing unauthorized access to other smart phone functionality. According to one embodiment of the disclosed technology, a method of operating a mobile device having an above-lock state and a below-lock state comprises receiving input data requesting invocation of an camera application when the mobile device is in the above-lock state and invoking the
(Continued)

requested camera application on the device, where one or more functions of the requested application are unavailable as a result of the mobile device being in the above-lock state.

25 Claims, 13 Drawing Sheets

Related U.S. Application Data

(60) Provisional application No. 61/363,142, filed on Jul. 9, 2010.

(51) Int. Cl.

| | |
|---|---|
| G06F 1/16 | (2006.01) |
| G06F 1/32 | (2006.01) |
| G06F 3/01 | (2006.01) |
| G06F 3/0481 | (2013.01) |
| G06F 21/31 | (2013.01) |
| G06F 21/62 | (2013.01) |
| H04N 5/232 | (2006.01) |
| G06F 3/0488 | (2013.01) |

(52) U.S. Cl.
CPC ............ *G06F 1/3203* (2013.01); *G06F 3/016* (2013.01); *G06F 3/0481* (2013.01); *G06F 3/0488* (2013.01); *G06F 21/31* (2013.01); *G06F 21/6218* (2013.01); *H04N 5/232* (2013.01); *H04W 12/06* (2013.01); *G06F 2221/2149* (2013.01)

(58) Field of Classification Search
USPC .............. 455/411, 550.1, 26.1; 345/169–173
See application file for complete search history.

(56) References Cited

U.S. PATENT DOCUMENTS

| | | |
|---|---|---|
| 7,095,442 B2 | 8/2006 | van Zee |
| 7,126,626 B2 | 10/2006 | Sawahara et al. |
| 7,495,652 B2 | 2/2009 | Klinghult |
| 7,643,895 B2 | 1/2010 | Gupta et al. |
| 7,657,849 B2 | 2/2010 | Chaudhri et al. |
| 7,933,583 B2 | 4/2011 | Tarkkala |
| 8,082,523 B2 | 12/2011 | Forstall et al. |
| 8,136,053 B1 | 3/2012 | Miller et al. |
| 8,239,784 B2 | 8/2012 | Hotelling et al. |
| 8,539,382 B2* | 9/2013 | Lyon et al. ................... 715/863 |
| 8,811,948 B2 | 8/2014 | Bandyopadhyay et al. |
| 9,009,630 B2 | 4/2015 | Kruzeniski et al. |
| 2002/0173345 A1 | 11/2002 | Swerup et al. |
| 2002/0190962 A1 | 12/2002 | Miura |
| 2003/0034185 A1 | 2/2003 | Kaikuranta |
| 2003/0117503 A1 | 6/2003 | Miyashita |
| 2004/0072589 A1* | 4/2004 | Hamamura et al. ....... 455/550.1 |
| 2005/0116840 A1* | 6/2005 | Simelius ......................... 341/22 |
| 2005/0197103 A1* | 9/2005 | Inoue ............................ 455/411 |
| 2006/0284969 A1* | 12/2006 | Kim et al. .................. 348/14.01 |
| 2007/0016958 A1* | 1/2007 | Bodepudi et al. .............. 726/27 |
| 2007/0032202 A1* | 2/2007 | Hamamura et al. ......... 455/90.1 |
| 2007/0150842 A1* | 6/2007 | Chaudhri et al. ............ 715/863 |
| 2007/0234235 A1* | 10/2007 | Scott ............................ 715/825 |
| 2008/0119217 A1 | 5/2008 | Coxhill |
| 2008/0168379 A1* | 7/2008 | Forstall et al. ............... 715/778 |
| 2008/0196945 A1 | 8/2008 | Konstas |
| 2008/0198239 A1* | 8/2008 | Ono ......................... H04N 5/232 348/222.1 |
| 2008/0220752 A1* | 9/2008 | Forstall et al. ............... 455/415 |
| 2008/0254767 A1* | 10/2008 | Jin ............................... 455/411 |
| 2008/0318550 A1 | 12/2008 | DeAtley |
| 2009/0006991 A1* | 1/2009 | Lindberg et al. ............. 715/763 |
| 2009/0061837 A1* | 3/2009 | Chaudhri et al. ............ 455/418 |
| 2009/0083847 A1* | 3/2009 | Fadell .................... G06F 21/316 726/16 |
| 2009/0089886 A1* | 4/2009 | Cheng et al. ................... 726/34 |
| 2010/0001967 A1* | 1/2010 | Yoo ............................... 345/173 |
| 2010/0060586 A1* | 3/2010 | Pisula et al. .................. 345/169 |
| 2010/0079380 A1* | 4/2010 | Nurmi ........................... 345/172 |
| 2010/0090564 A1* | 4/2010 | Oh et al. ....................... 310/328 |
| 2010/0123664 A1* | 5/2010 | Shin et al. .................... 345/169 |
| 2010/0127998 A1* | 5/2010 | Hyun ............................ 345/173 |
| 2010/0130263 A1 | 5/2010 | Zhang et al. |
| 2010/0146384 A1* | 6/2010 | Peev et al. .................... 715/255 |
| 2010/0157096 A1 | 6/2010 | Park et al. |
| 2010/0159995 A1* | 6/2010 | Stallings et al. ............. 455/566 |
| 2010/0162182 A1* | 6/2010 | Oh et al. ....................... 715/863 |
| 2010/0248689 A1* | 9/2010 | Teng et al. .................... 455/411 |
| 2010/0269040 A1* | 10/2010 | Lee ................................ 715/702 |
| 2010/0306705 A1* | 12/2010 | Nilsson ......................... 715/835 |
| 2010/0306718 A1* | 12/2010 | Shim et al. ................... 715/863 |
| 2011/0076981 A1* | 3/2011 | Singh ..................... H04M 1/673 455/404.1 |
| 2011/0081889 A1* | 4/2011 | Gao et al. ..................... 455/411 |
| 2011/0248941 A1 | 10/2011 | Abdo et al. |
| 2011/0267306 A1 | 11/2011 | Chang et al. |
| 2012/0009896 A1 | 1/2012 | Bandyopadhyay et al. |
| 2013/0283199 A1 | 10/2013 | Selig et al. |
| 2013/0326582 A1 | 12/2013 | Kruzeniski et al. |
| 2014/0040756 A1 | 2/2014 | Bukurak et al. |
| 2014/0331158 A1 | 11/2014 | Hicks et al. |

FOREIGN PATENT DOCUMENTS

| | | |
|---|---|---|
| JP | H11-266430 | 9/1999 |
| JP | 2001-238124 | 8/2001 |
| JP | 2002-341979 | 11/2002 |
| JP | 2003-189165 | 7/2003 |
| JP | 2005-006135 | 1/2005 |
| JP | 2005-151052 | 6/2005 |
| JP | 2005-191991 | 7/2005 |
| JP | 2006-166012 | 6/2006 |
| JP | 2008-205841 | 9/2008 |
| KR | 10-2004-0093330 A | 11/2004 |
| KR | 10-2010-0000274 A | 1/2010 |
| KR | 10-2010-0005438 A | 1/2010 |
| KR | 10-2010-0039957 A | 4/2010 |
| RU | 2391796 C2 | 6/2010 |

OTHER PUBLICATIONS

"Denoue, et al.," "Shared Text Input for Note Taking on Handheld Devices," In Proceedings of ACM Human Factors in Computing Systems, Apr. 20, 2002, pp. 794-795.
Hughes, "Cingular BlackJack," 3 pages (document marked Feb./Mar. 2007, downloaded before Jun. 30, 2010).
International Search Report for PCT/US2011/043273, mailed Feb. 9, 2012, 4 pages.
Notice on First Office Action, CN 201110204686.2, dated Oct. 29, 2013, 14 pages.
Office Action, RU 2013100171, dated Mar. 26, 2013, 4 pages.
Office Action, U.S. Appl. No. 13/489,165, dated Dec. 19, 2013, 12 pages.
Patent Examination Report No. 1, AU 2011274572, dated Jan. 22, 2014, 4 pages.
Office Action, RU 2013100171, dated Oct. 9, 2015, 3 pages.
Notice of Acceptance, AU 2011274572, dated Aug. 21, 2014, 3 pages.
Office Action, Chile Patent Application No. 201300041, document dated Jan. 15, 2015, 7 pages.
Office Action, Japan Patent Application No. 2013-519713, document dated Mar. 25, 2015, 14 pages (with English Translation).
Office Action, RU 2013100171, dated Jun. 11, 2015, 7 pages.
Patent Examination Report No. 2, AU 2011274572, dated Apr. 17, 2014, 3 pages.
Second Office Action Issued in Chinese Patent Application 201110204686.2, document dated Jun. 16, 2014, 10 pages.
Third Office Action Issued in Chinese Patent Application 201110204686.2, document dated Dec. 23, 2014, 10 pages.

(56) References Cited

OTHER PUBLICATIONS

Office Action Issued in Chile Patent Application No. 201300041, document dated Aug. 5, 2015, 5 pages.
Office Action Issued in Israel Patent Application No. 224050, Mailed Date: Jun. 9, 2016, 9 Pages.
Office Action issued in Japanese Patent Application No. 2013-519713, Mail Date: Dec. 22, 2015, 6 Pages.
Notice of Allowance issued in Russian Patent Application No. 2013100171, Mail Date: Feb. 3, 2016, 11 Pages (w/o English Translation).

* cited by examiner

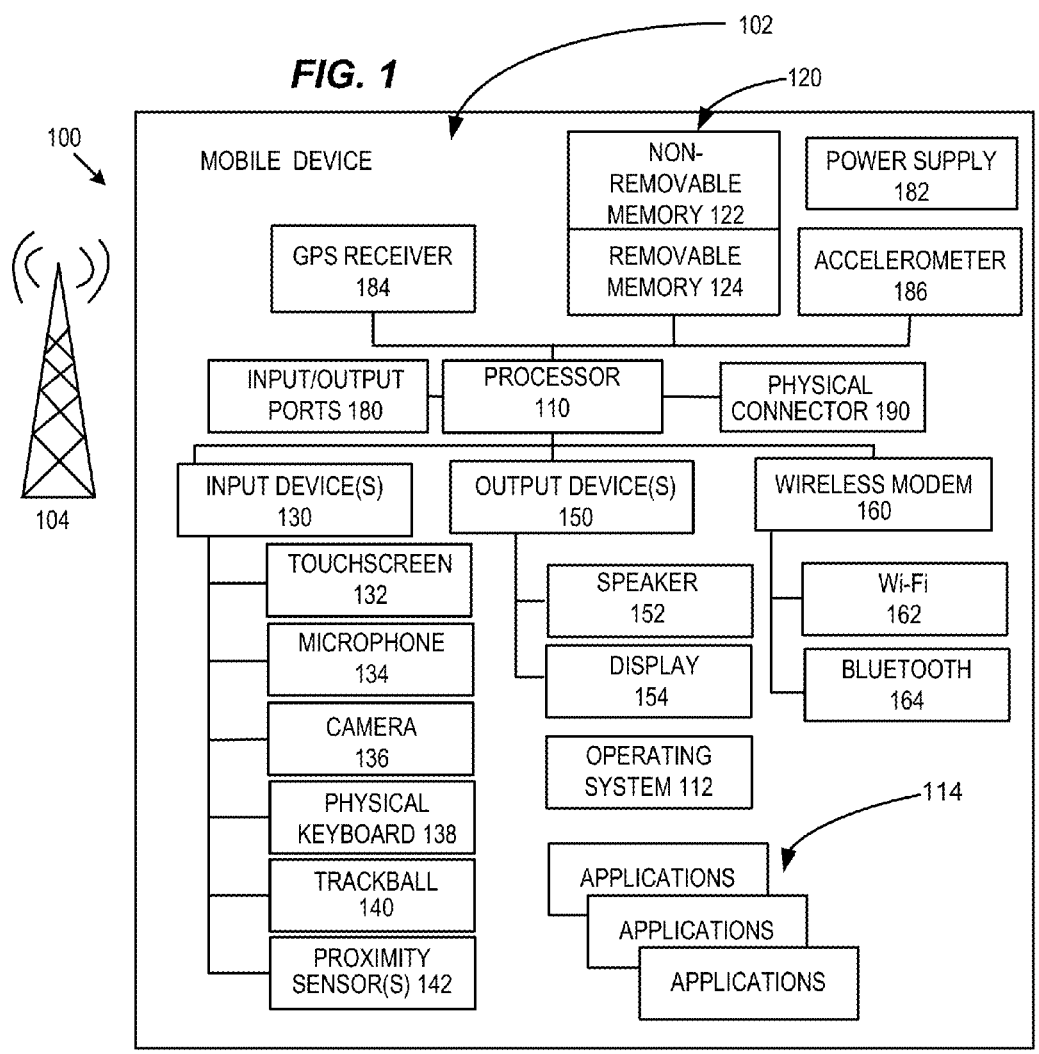

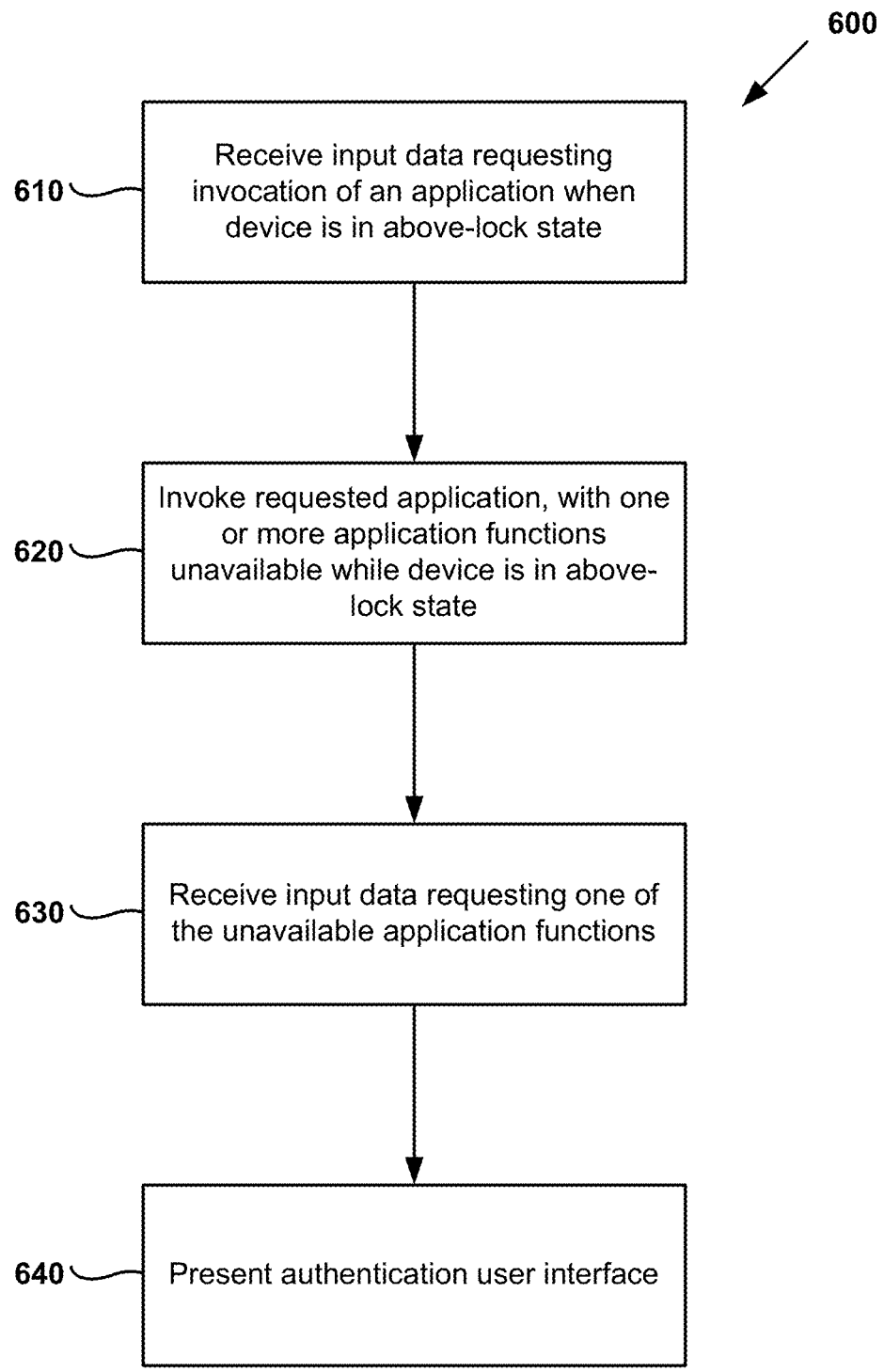

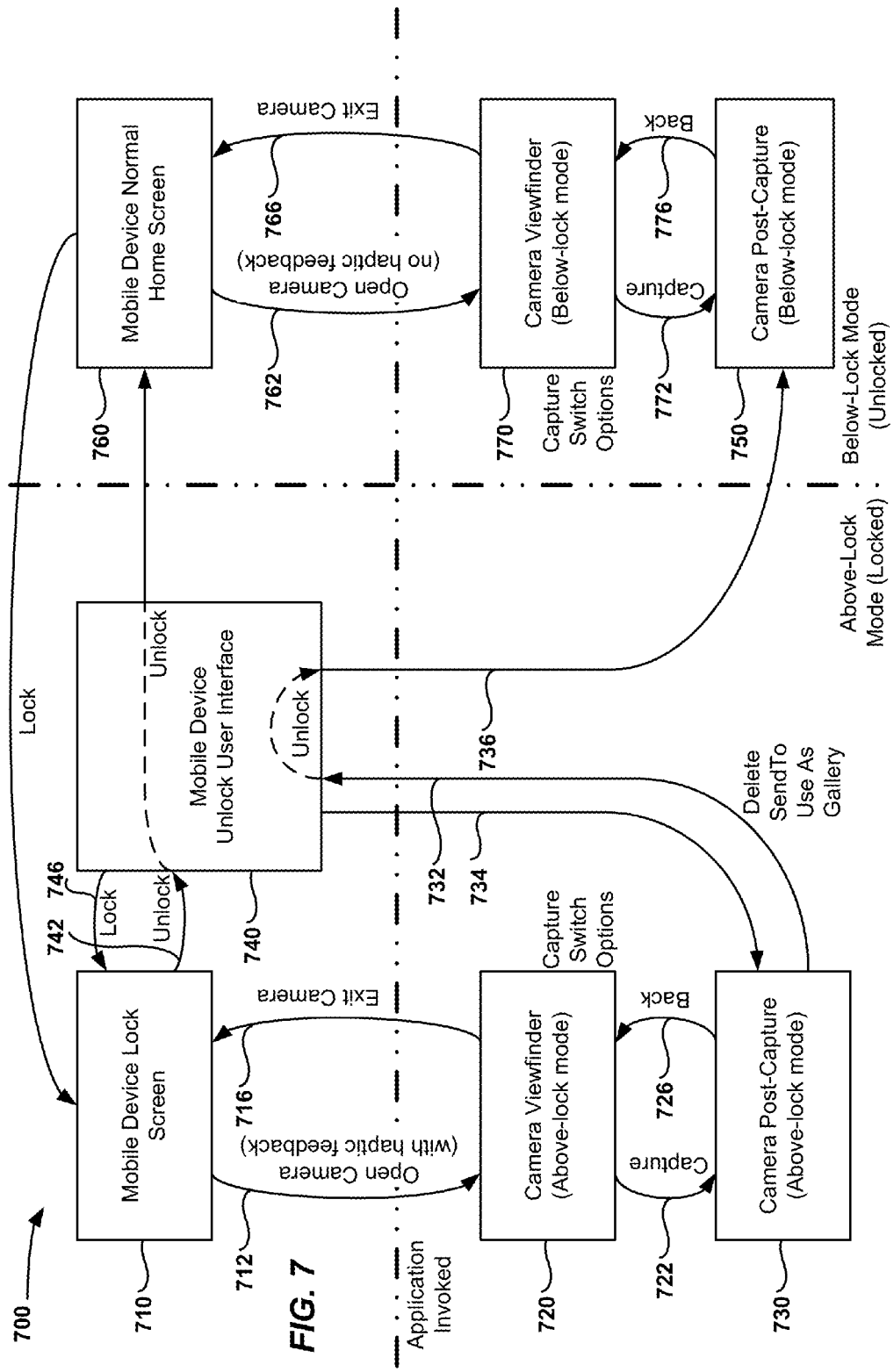

ABOVE-LOCK CAMERA ACCESS

CROSS REFERENCE TO RELATED APPLICATION

This application is a continuation of U.S. patent application Ser. No. 12/940,913, filed Nov. 5, 2010, which claims the benefit of U.S. Provisional Application No. 61/363,142, filed Jul. 9, 2010, which applications are incorporated herein by reference in their entirety.

FIELD

The present disclosure pertains to apparatus and methods for enhancing user experiences when using a mobile device comprising an image-capture device, such as a still or video camera.

BACKGROUND

With the increasing popularity of mobile devices having image-capture functionality, including cellphone devices, handheld devices, handheld computers, smartphones, and PDAs, there is a need for improving the user experience by allowing quick access to the image-capture functionality of mobile devices while also preventing accidental and/or unauthorized access to other functionalities on the device.

Mobile devices with cameras often have a locked mode to prevent accidental or unauthorized access to the device. However, in many situations it is desirable to capture a photograph or video without needing to unlock a mobile device (e.g., by using a key combination, entering a personal identification number (PIN), or using fingerprint recognition) in order to quickly and spontaneously "capture the moment."

Therefore, there exists ample opportunity for improvement in technologies to allow mobile device users quick access to a subset of image-capture functionality in order to quickly capture images, while not allowing access to other mobile device functionalities, including access to private information on the mobile device.

SUMMARY

Apparatus, computer-readable storage media, and methods are disclosed for allowing mobile device users to "capture the moment" by quickly accessing a subset of mobile device image-capture functionalities while the mobile device is in an above-lock state. In certain embodiments, this access can be provided even when the device is in a state that requires authentication to access.

The described techniques and tools for solutions for improving the mobile device experience and performance can be implemented separately, or in various combinations with each other. As will be described more fully below, the described techniques and tools can be implemented on hardware that includes touch screen keyboards or hardware keyboards. As will be readily apparent to one of ordinary skill in the art, the disclosed technology can be implemented using various handheld platforms coupled with an image capture device, including, but not limited to, cellphones, smartphones, PDAs, handheld devices, handheld computers, PDAs, touch screen tablet devices, tablet computers, and laptop computers.

In some examples of the disclosed technology, a method of operating a mobile device having a plurality of authentication states, including an above-lock state and a below-lock state, includes receiving first input data requesting invocation of an image-capture application when the mobile device is in the above-lock state and invoking the requested application on the device, where one or more functions of the requested application available in the below-lock state are unavailable to a user of the mobile device while the mobile device is in the above-lock state.

In some examples, the method further includes receiving second input data requesting one of the unavailable functions and, based on the second input data, presenting a user interface to the user operable to change the state of the mobile device to the below-lock state. In some examples, the method further includes receiving third input data use the user interface and based on the third input data, changing the state of the mobile device to the below-lock state, and after changing the state of the mobile device, providing the requested application on the mobile device, where at least one of the previously unavailable functions is made available to the user.

In some examples, the requested application is an image capture application. In some examples, the image capture application includes a camera roll. In some examples, the requested application has one or more functions available when in the above-lock state, including at least one or more of the following: capturing an image, providing a capture settings menu, or toggling between video or still image capture mode. In some examples, the functions unavailable in the above-lock state include at least one or more of the following: deleting an image, sending an image, or uploading an image to a remote server.

In some examples of the disclosed technology, the method further includes capturing an image and after the capturing, determining the state of the mobile device, where if the state of the mobile device is the below-lock state, the image is transmitted to a location remote from the mobile device, but if the state of the mobile device is the above-lock state, then not transmitting the image to a location remote from the mobile device. In some examples, the method further includes waking the mobile device from a standby state based on the receiving of first input data.

In some examples of the disclosed technology, the requested application is an image capture application, and the first input data is received as a result of an image-capture button being depressed for a predefined duration. In some examples, the first input data is received as a result of both an image-capture button press being detected and second input data being received after detection of the image-capture button press. In some examples, the first input data is received as a result of an image-capture button being pressed concurrently with another button coupled to the mobile device. In some examples, providing the requested application includes evaluating a previously-stored user setting permitting the requested application to be invoked when the mobile device is in the locked state.

In some examples, the method further includes providing haptic feedback with the mobile device after the receiving of the first input data. In some examples, the method further includes evaluating a proximity sensor coupled to the mobile device, and wherein the providing the requested application occurs unless the evaluating determines an object in proximity with the mobile device. In some examples, determining an object in proximity uses a light sensor (e.g., a photodiode) instead of a proximity sensor, while in other examples, determining an object in proximity uses signals from both a proximity sensor and a light sensor.

Another example of the disclosed technology includes one or more computer-readable media storing computer-readable instructions that when executed by a computer cause the computer to perform a method of operating a mobile device having a plurality of authentication states, including an above-lock state and a below-lock state, the method including receiving first input data requesting invocation of an application when the mobile device is in the above-lock state and invoking the requested application on the mobile device, where one or more functions of the requested application available in the below-lock state are unavailable to a user of the mobile device while the mobile device is in the above-lock state.

In some examples of the computer-readable media, the method further includes receiving second input data requesting one of the unavailable functions, based on the second input data, presenting a user interface to the user operable to change the state of the mobile device to the below-lock state, receiving third input data using the user interface, based on the third input data, changing the state of the mobile device to the below-lock state, and after the changing the state of the mobile device, providing the requested application on the mobile device, wherein at least one of the previously unavailable functions is made available to the user.

A further example of the disclosed technology is an apparatus including one or more image capture devices, one or more input sources coupled to the image capture device, one or more processors, and one or more computer-readable media storing computer-readable instructions that when executed by the processors, cause the apparatus to perform a method of invoking an image capture application. The computer-readable instructions include instructions for receiving input data from the input source, instructions for locking and unlocking the apparatus using authentication, instructions for invoking the image capture application, the image capture application being operable to capture an image using the image capture device, the image capture application including a set of a plurality of functions for capturing and processing the image. The image capture application can detect a lock state of the apparatus, and, if the apparatus is unlocked, the image capture application allows access to the set of functions, but if the apparatus is locked, the image capture application allows access to one or more but not all of the set of functions.

Some examples of the apparatus further include a proximity sensor and proximity-checking instructions for evaluating the status of the proximity sensor, including computer-readable instructions for checking the status of the proximity sensor after the input module receives the input data, instructions for preventing invocation of the image capture module if the evaluated status indicates that an object is in proximity with the apparatus, and instructions for allowing invocation of the image capture module if the checked status indicates that an object is not in proximity with the apparatus.

In some examples of the apparatus, the input source is coupled to a camera button, the camera button being coupled to a low-power state power supply.

The foregoing and other objects, features, and advantages of the invention will become more apparent from the following detailed description, which proceeds with reference to the accompanying figures.

BRIEF DESCRIPTION OF THE DRAWINGS

FIG. 1 is a system diagram depicting an exemplary mobile device, including a variety of optional hardware and software components.

FIG. 6 is a flow chart that outlines an exemplary implementation of the disclosed technology.

FIG. 7 is a state diagram that outlines an exemplary implementation of the disclosed technology.

DETAILED DESCRIPTION

Figure 2A:
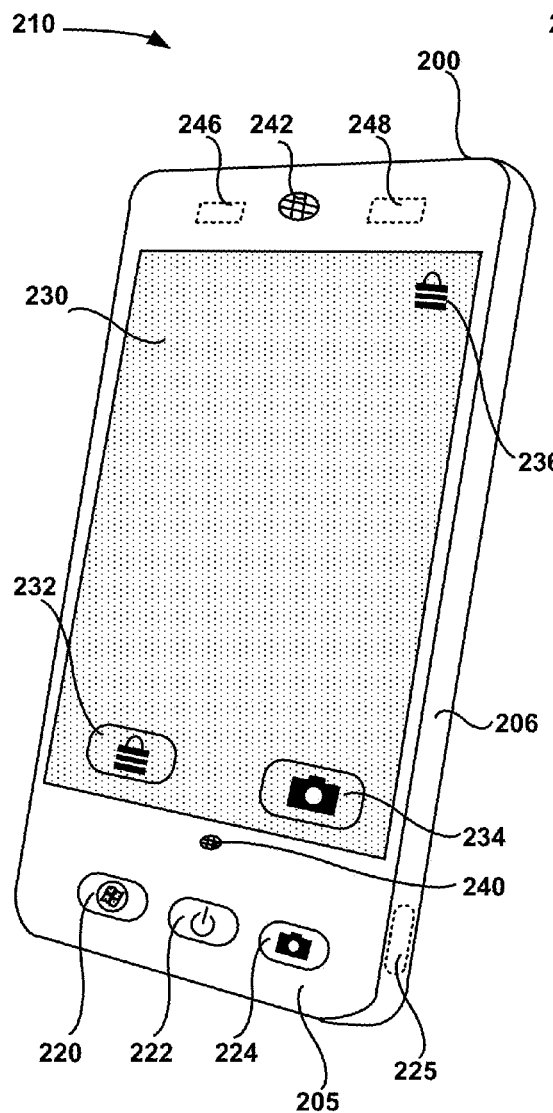
FIGS. 2A and 2B illustrate a generalized example of a mobile device, including a touch screen display, image-capture device, proximity sensors, and buttons.

This disclosure is set forth in the context of representative embodiments that are not intended to be limiting in any way.

As used in this application and in the claims, the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items.

The described things and methods described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged, omitted, or performed concurrently. Moreover, for the sake of simplicity, the attached figures may not show the various ways in which the disclosed things and methods can be used in conjunction with other things and methods. Additionally, the description sometimes uses terms like "produce," "generate," "select," "capture," and "provide" to describe the disclosed methods. These terms are high-level abstractions of the actual operations that are performed. The actual operations that correspond to these terms can vary depending on the particular implementation and are readily discernible by one of ordinary skill in the art.

Any of the disclosed methods can be implemented as computer-executable instructions stored on one or more computer-readable storage media (e.g., non-transitory computer-readable media, such as one or more volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, HTML5, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Theories of operation, scientific principles or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

In the following description, certain terms may be used such as "up," "down," "upper," "lower," "horizontal," "vertical," "left," "right," "over," "on," "near," and the like. These terms are used, where applicable, to provide some clarity of description when dealing with relative relationships. But, these terms are not intended to imply absolute relationships, positions, and/or orientations.

As used in this disclosure, above-lock means that a device is in a state where at least some functions of the device are not accessible to a user as a result of the device being in the above-lock (or "locked") state. As used in this disclosure, below-lock means that a device is in a state where additional functionality is available that is not accessible to a user in the above-lock state. In addition, a device may be described as having other states that are not necessarily mutually exclusive with the above-lock or below-lock authentication states. For example, in some embodiments, a device can be in either a low-power state or an active state while concurrently being in an above-lock state. Similarly, in some embodiments, a device can be in a below-lock state while concurrently being in a low-power or active state.

The disclosed technology relates to the behavior of an image-capture application on a mobile device having an above-lock state and a below-lock state. Certain embodiments of the disclosed technology permit a fast capture experience that allows the end user to "capture the moment" by providing intuitive mechanisms to the mobile device user to capture a photo while the device is locked, without needing to go through the delay of unlocking the device.

For example, Yan is out having lunch with his co-workers. Bob takes a big bite of his messy burger and sure enough, ketchup, mustard, and relish spill down the front of his shirt. Despite Bob's protests, Yan grabs his camera phone, which employs the disclosed technology, including an above-lock and a below-lock state. With one hand fending off Bob's attempt to take away his camera phone, Yan single-handedly snaps a photo for future advantage. Yan can quickly snap a picture since his camera phone allows him to capture photos even when the device is in an above-lock state.

The disclosed technology includes various approaches to improving the speed disparity between capturing images with a mobile device camera when the mobile device is initially locked compared to when the device is unlocked. One exemplary approach is to allow mobile device users quick and direct access to a subset of functions available within an image-capture application for a mobile device. For example, it is desirable (but not required) for an image to be captured with a mobile device using only one hand. Furthermore, it is also desirable (but not required) for image-capture functionality on the device to be intuitive and discoverable to a user unfamiliar with the device.

Another exemplary approach, which can be used alone or in combination with the other disclosed approaches, allows access to functions for quick image capture, while not allowing access to other functionality without unlocking the device. For example, other users besides the primary user or owner of the device may want to quickly capture an image without needing to unlock the device or to know the primary user's password. However, the primary user may not want other users to be able to access other functions of the camera application, such as viewing previously-captured images or sending images to other users via e-mail or SMS.

Another exemplary approach, which can be used alone or in combination with the other disclosed approaches, reduces the probability of accidental image capture (for example, while a mobile device is in a user's pocket or handbag) while the mobile device is in above-lock mode, while still allowing quick access to intentional image capture.

Another exemplary approach, which can be used alone or in combination with the other disclosed approaches allows seamless integration with the regular lock/unlock experience provided by the mobile device.

Another exemplary approach, which can be used alone or in combination with the other disclosed approaches, provides the end user a clear indication that the image-capture device is functioning in an above-lock state, while still complying with all relevant security restrictions and requirements that are applicable in the above-lock state.

In certain embodiments of the disclosed technology, when in the above-lock state, an image-capture application on the mobile device can allow access to a subset of functionality available in the below-lock state. For example, functionality associated with the viewfinder (capture mode) of an image-capture application can provide photo capture, video capture, displaying a most-recently captured photograph (i.e., a "confirmation image"), and adjustment of image-capture settings, such as flash, zoom, autofocus, white balance, and other such image operations. The available viewfinder functionality in the above-lock state typically includes operations that would not compromise a user's privacy if accessed by an authenticated user.

Furthermore, other functionality normally available in below-lock state(s) can be disabled in above-lock state(s). For example, auto-upload of photographs can be disabled in the above-lock state to prevent accidently- or undesirably-captured photographs from being uploaded to a remote server or computing cloud. Other functions that can be disabled include delete image, send to, use as, view image gallery, and other such private image operations.

In some examples, the user can proceed to an authentication screen from the above-lock viewfinder, and, after successfully authenticating, be returned to the full-featured viewfinder that is available only when in a below-lock state.

In some examples, a mobile device comprises an additional sleep or standby state in addition to an above-lock state. For example, if the device is in sleep mode in addition to being locked, then the lock-state camera experience can be triggered when the end user triggers the mechanism to invoke the capture experience. Alternatively, if the device is in sleep mode but not locked, then triggering the camera experience causes the regular (unlocked) camera experience to be initiated. As noted above, the above-lock and below-lock states are not necessarily mutually exclusive with sleep, standby, active, or other power states.

I. Example Mobile Device

FIG. 1 is a system diagram depicting an exemplary mobile device 100 including a variety of optional hardware and software components, shown generally at 102. Any components 102 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 104, such as a cellular or satellite network.

The illustrated mobile device 100 can include a controller or processor 110 (e.g., signal processor, microprocessor, ASIC, or other control and processing logic circuitry) for performing such tasks as signal coding, data processing, input/output processing, power control, and/or other functions. An operating system 112 can control the allocation and usage of the components 102, including power states, above-lock states, and below-lock states, and provide support for one or more application programs 114. The application programs can include common mobile computing applications (e.g., image-capture applications, email applications, calendars, contact managers, web browsers, messaging applications), or any other computing application.

The illustrated mobile device 100 can include memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory or a Subscriber Identity Module (SIM) card, which is well known in GSM communication systems, or other well-known memory storage technologies, such as "smart cards." The memory 120 can be used for storing data and/or code for running the operating system 112 and the application programs 114. Example data can include web pages, text, images, sound files, video data, or other data sets to be sent to and/or received from one or more network servers or other devices via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 100 can support one or more input devices 130, such as a touch screen 132, microphone 134, camera 136, physical keyboard 138, trackball 140, and/or proximity sensor 142, and one or more output devices 150, such as a speaker 152 and one or more displays 154. Other possible output devices (not shown) can include piezoelectric or haptic output devices. Some devices can serve more than one input/output function. For example, touch screen 132 and display 154 can be combined into a single input/output device.

A wireless modem 160 can be coupled to an antenna (not shown) and can support two-way communications between the processor 110 and external devices, as is well understood in the art. The modem 160 is shown generically and can include a cellular modem for communicating with the mobile communication network 104 and/or other radio-based modems (e.g., Bluetooth 164 or Wi-Fi 162). The wireless modem 160 is typically configured for communication with one or more cellular networks, such as a GSM network for data and voice communications within a single cellular network, between cellular networks, or between the mobile device and a public switched telephone network (PSTN).

The mobile device can further include at least one input/output port 180, a power supply 182, a satellite navigation system receiver 184, such as a Global Positioning System (GPS) receiver, an accelerometer 186, a gyroscope (not shown), and/or a physical connector 190, which can be a USB port, IEEE 1394 (FireWire) port, and/or RS-232 port. The illustrated components 102 are not required or all-inclusive, as any components can be deleted and other components can be added.

II. Example Mobile Device

Figure 2B:
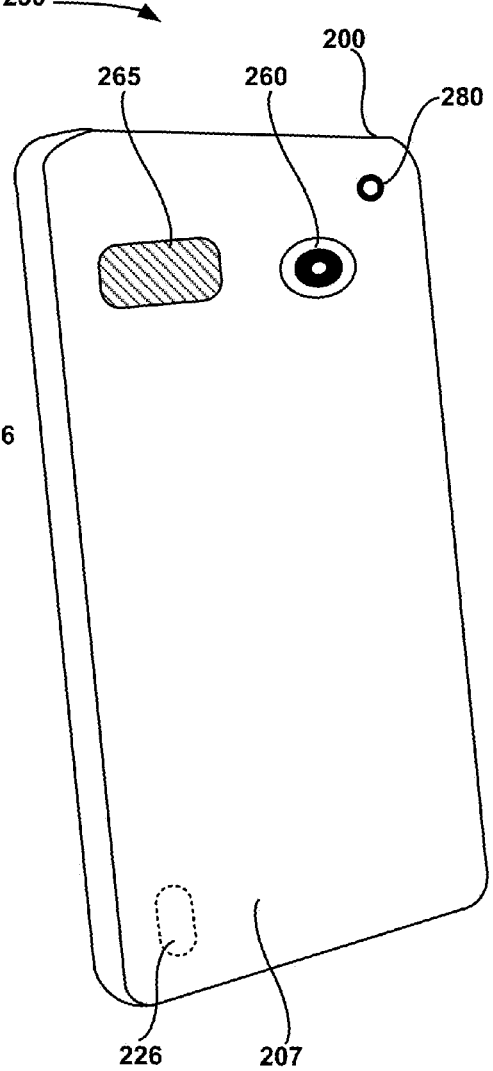

FIG. 2A depicts a front view 210 of an example mobile device 200, while FIG. 2B depicts a rear view 250 of the mobile device. As shown, the mobile device 200 includes several hardware buttons, including a home button 220, a power button 222, and a camera shutter (image-capture) button 224. Also depicted is a touch screen display 230, which is shown displaying a touch screen unlock button 232, a touch screen camera shutter button 234, and a locked-mode indicator 236.

The mobile device 200 includes a microphone 240 and speaker 242, along with two proximity sensors 246 and 248, situated below the surface of the mobile device. In some examples, a single, or three or more, proximity sensors can be used. Any suitable proximity sensor(s) can be employed.

In some examples, the proximity sensors 246 and 248 emit an infrared beam and receive a reflected infrared beam, which is reflected off the surface of a nearby object that has been illuminated by the emitted infrared beam. An intensity measurement, or other measured property for the received beam, can be used to determine whether an object is in proximity with the mobile device 200. In other examples, the touch screen display 230 can be used as a proximity sensor. For example, capacitance values detected using a capacitive touch screen sensor coupled with the touch screen display 230 are used to determine whether an object is nearby (e.g., within 1 cm of the touch screen display). In some examples using a touch screen sensor, a limited number of rows or columns of the touch screen display 230 are active when detecting proximity, in order to reduce power consumption. In some examples, an image sensor coupled with a camera lens 260 can be used as a light sensor to detect an object in proximity with the mobile device 200. For example, objects in proximity with the mobile device 200 can be determined using light received through the camera lens 260 with an image sensor based on CMOS, CCD (charge-coupled device), or other suitable technology. In some examples, only a few rows, columns, or pixels of the image sensor are active when checking proximity, in order to reduce power consumption. In some examples of mobile devices having multiple cameras, one of the cameras can be selected to perform proximity checking based on the selected camera having lower power consumption, or having an advantageous position for checking proximity when the mobile device is in a stored position. In some examples, a photodiode 280 can be used as a light sensor instead of a camera image sensor. In some examples, signals from one or more proximity sensors (e.g., proximity sensors 246 and 248, and/or the touch screen display 230) can be combined with signals from a light sensor (e.g., an image sensor coupled with camera lens 260 and/or a photodiode 280) in order to determine objects in proximity with the mobile device 200 with improved accuracy.

The camera shutter button 224 of the mobile device 200 is a dedicated dual-action camera shutter button, with the ability to detect "half-press" and "full-press" as distinct, separate actions. As is readily understood to those of skill in the art, a half-press refers to the partial actuation of a button or other control, while a full-press refers to a further actuation of the button or control past a determined limit. In some examples, the dual action camera shutter button 224 is associated with the following attributes. When a half-press is detected, input data is received with the mobile device that is associated with auto-focus functionality. When a full-press is detected, input data is received that is associated with camera invocation and image capture. In some examples, the end user can set an option to determine whether or not input data resulting from a half-press or full-press of the camera button initiates functionality when, e.g., the display 230 is turned off or the device is in standby mode. In some examples, the camera shutter button 224 is not overloaded with other functions during particular states of operation, for example, when the mobile device 200 is booting. Various button debounce times (e.g., 62 milliseconds) can be used for detecting a full-press, a half-press, or both. In some examples, a single-action camera button can be used. While the camera shutter button 224 is shown located on a front surface 205 of the mobile device 200, in other examples, a camera shutter button can be positioned at alternate locations. For example, the camera shutter button 224 can be located at location 225 (on a side surface 206) or location 226 (on a rear surface 207), respectively, of the mobile device.

Turning to the rear view 250 shown in FIG. 2B, the example mobile device 200 includes the camera lens 260 and an electronic flash 265. In some examples, there is no flash present in the mobile device 200. The individual components (e.g., the hardware buttons 220, 222, and 224, microphone 240, speaker 242, touch screen display 230, camera lens 260 and flash 265) can be coupled to a mobile device chassis (not shown), which is connected to internal components of the mobile device 200, for example: one or more processors, a piezoelectric actuator, a power supply, and a modem.

As shown in FIGS. 2A and 2B, there are several considerations that can be made in the placement of components on the mobile device 200, such as the home button 220, power button 222, camera shutter button 224, the camera lens 260, electronic flash 265, proximity sensors 246 and 248, and the photodiode 280. For example, it is desirable that the placement of the camera shutter button 224 enables or even encourages a user to naturally position the mobile device 200 in a landscape position when capturing images. It is also desirable that the camera shutter button 224 be positioned such that operation of the button is facilitated using an index finger or thumb. For example, the camera shutter button 224 as shown can be easily accessed with a user's right thumb while capturing an image with the mobile device 200 in a landscape position. In other examples, the camera shutter button 224 can be moved to other suitable positions, for example, locations 224 or 226. It is also desirable that the camera shutter button 224 and/or power button 222 be positioned to avoid accidental actuation, in order to mitigate the chance that an image capture application will be launched inadvertently.

Another desirable aspect of the placement of the camera shutter button 224 is to be positioned such that a user can easily actuate the button without covering the camera lens 260 or one or more of the proximity sensors 246 and 248. For example, as shown in FIG. 2A, the proximity sensors 246 and 248 and photodiode 280 are positioned at a location where a user's fingers are less likely to be nearby the proximity sensors when actuating the camera shutter button 224.

III. Example Mobile Device Image Capture Application

Figure 3A:
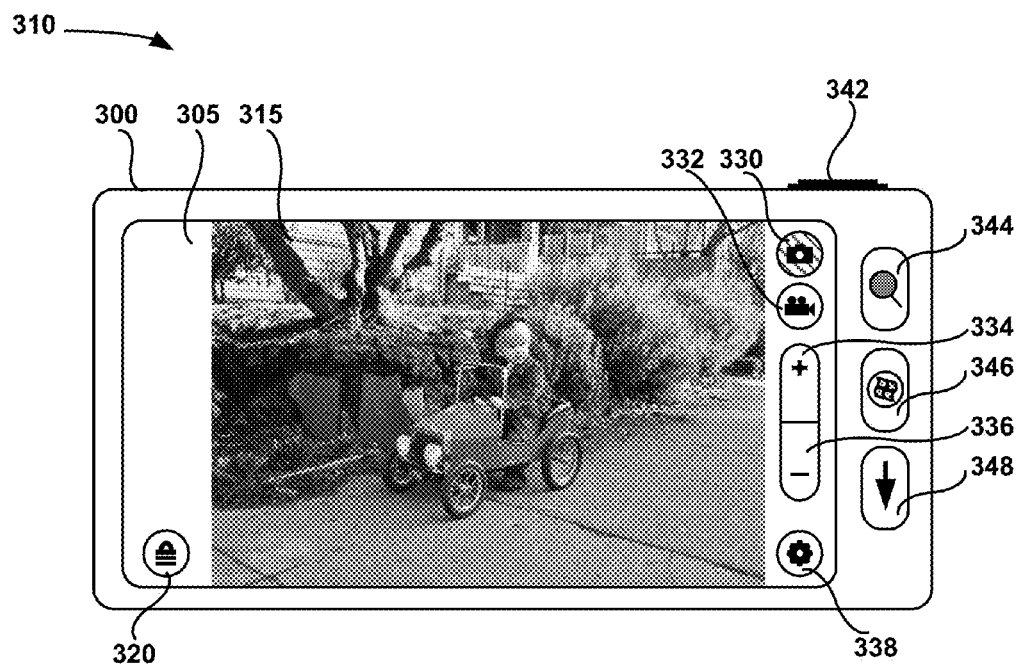
FIGS. 3A and 3B illustrate a generalized example of a mobile device while providing an image-capture application.
Figure 3B:
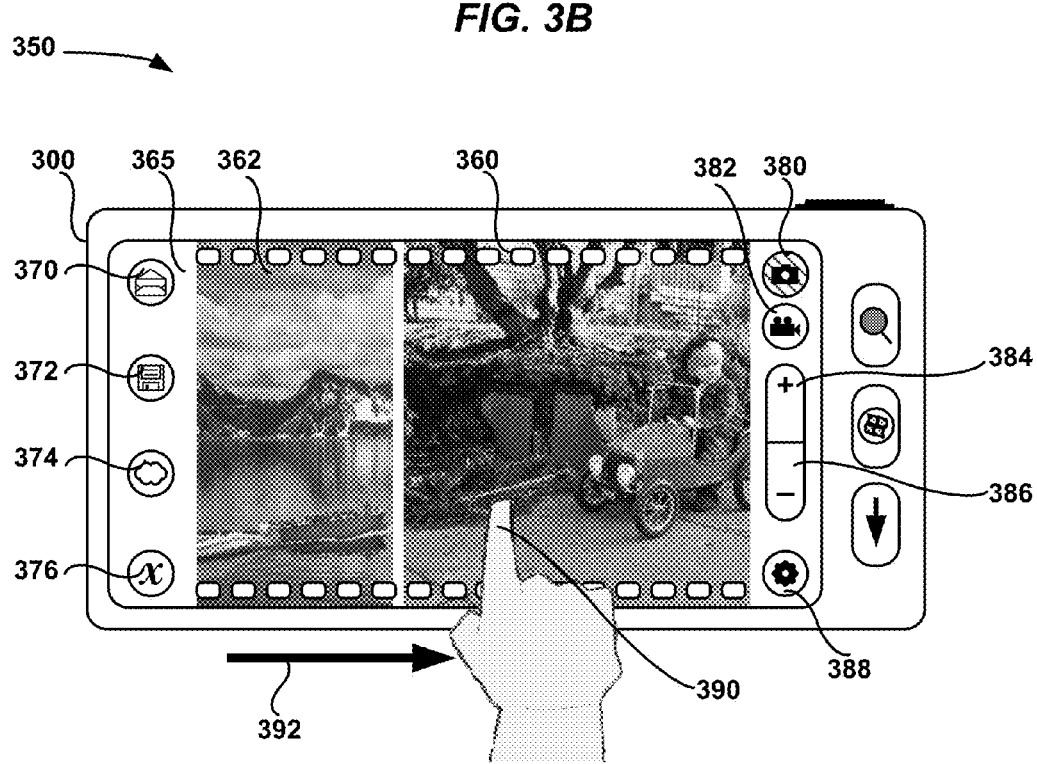

FIG. 3A depicts a front view 310 of an example mobile device 300 displaying an image-capture application in an above-lock mode on a touch screen display 305, while FIG. 3B depicts a front view 350 of the mobile device 300 displaying an image-capture application in below-lock mode. The mobile device 300 in both FIGS. 3A and 3B is shown after capturing an image using a camera coupled to the mobile device.

As shown in FIG. 3A, the mobile device 300 is depicted after capturing an image 315 using a camera (not shown) coupled to the mobile device while the device was in above-lock mode. As shown, the display 305 of the mobile device 300 also includes an above-lock indicator 320, along with controls 330, 332, 334, 336, and 338, which can be used to control a subset of the image-capture functionality available in below-lock mode. These controls include a still image capture mode button 330 (highlighted to indicate that still capture is the currently selected capture mode), a video capture mode control 332, zoom-in and zoom-out controls 334 and 336, and an options control 338. The mobile device 300 also includes several hardware buttons, including a camera shutter button 342 located on a side surface of the mobile device, as well as a search button 344, a home button 346, and a back button 348, which are located on a front surface of the mobile device. These hardware buttons 342, 344, 346, and 348 can be used for invoking and/or executing various operations using the mobile device 300. For example, camera shutter button 342 can be used for invoking and/or executing an image capture application, as well as controlling functions within the image capture application, such as autofocusing and/or operating a camera shutter. Search button 344 can be used to invoke and/or execute a user interface for searching data. Home button 346 can be used for navigating software functionality on the mobile device 300 by, for example, setting the mobile device to a home screen state, or invoking other assigned functionality. Back button 348 can be used for navigating software functionality by, for example, requesting a previously requested object that was viewed using the mobile device 300.

Turning to FIG. 3B, the mobile device 300 is depicted after capturing an image 360 captured using a camera while the mobile device 300 was in a below-lock mode. As shown, the display 365 of the mobile device 300 does not include an above-lock indicator, and displays controls for additional functions that were not available in the above-lock mode, including email image 370, save image 372, upload image 374, and delete image 376. Also shown on the right-hand side of the mobile device 300 are controls that are also available in above-lock mode, including a still image capture mode button 380, a video mode capture mode button 382, zoom-in and zoom-out buttons 384 and 386, and an options control button 388. The mobile device is shown displaying an example "camera roll" application, which allows a user to see previously-captured images (e.g., image 362) by sliding a finger 390 in the direction shown by the arrow 392, which moves images 360 and 362 in the direction of finger motion across the display 365. As shown, film "sprocket holes" can be displayed on the images 360 362 to emphasize the camera roll metaphor, which is discussed further below.

Although the controls are shown as being displayed on a touch screen, some or all of the controls can be implemented using hardware buttons.

IV. Example Mobile Device Settings

Figure 4A:
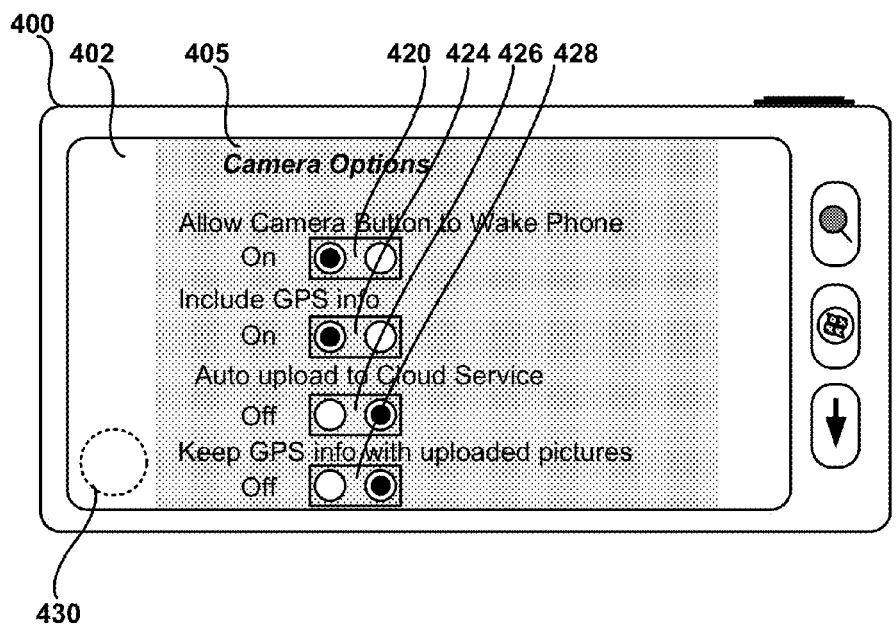
FIGS. 4A and 4B illustrate a generalized example of a mobile device while presenting image-capture settings and options.
Figure 4B:
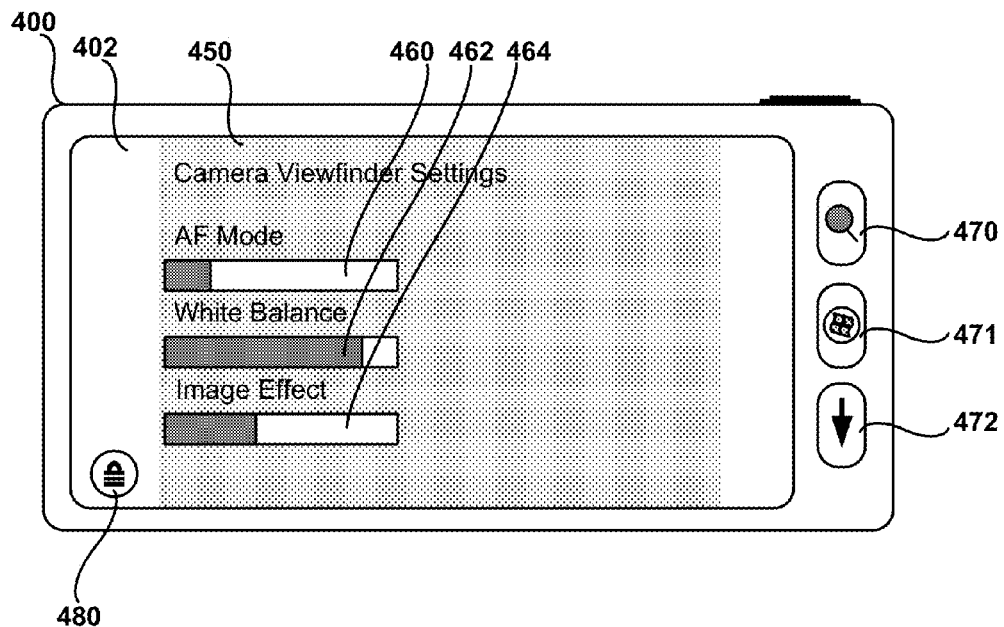

FIGS. 4A and 4B depict an example mobile device 400 displaying options on a display 402. In the view 410 shown in FIG. 4A, the mobile device 400 is shown displaying a camera options menu 405 that includes radio buttons 420 for allowing the camera button to wake the phone, along with radio buttons for setting options, including radio buttons 424 for including GPS info with pictures or videos, radio buttons 426 for automatically uploading photos to a computing cloud, and radio buttons 428 for keeping GPS information with pictures that are uploaded to the computing cloud. In some examples, the camera settings options menu 405 and associated radio buttons 420, 424, 426, and 428 are only available when the mobile device 400 is in a below-lock mode. Thus, a mobile device user can configure privacy options to control whether and how GPS information and captured images are uploaded to the computing cloud. As shown, the mobile device 400 in FIG. 4A is in a below-lock mode, as indicated by the lack of a below-lock indicator (which, if above-lock, would be located in the area indicated by dashed circle 430).

In the view 440 shown in FIG. 4B, the mobile device 400 is shown displaying a camera viewfinder settings menu 450 that includes a scroll bar 460 for adjusting the autofocus mode for the camera, a scroll bar 462 for adjusting the white balance setting for the camera, and a scroll bar 464 for adjusting the image effect setting for the camera. In the example shown, the scroll bars can be adjusted using input data received from the touch screen display 402. In other examples, input data received from hardware buttons (e.g., hardware buttons 470-472), or other input data sources can be used. As shown, the display 402 also displays an above-lock indicator 480, which indicates that the mobile device 400 is in an above-lock state. The adjustments available on the setting menu 450 are those associated with the viewfinder functionality of an image-capture application, and thus, in this example, can be accessed in above-lock and below-lock states.

V. Example Mobile Device Lock and Authentication Screens

Figure 5A:
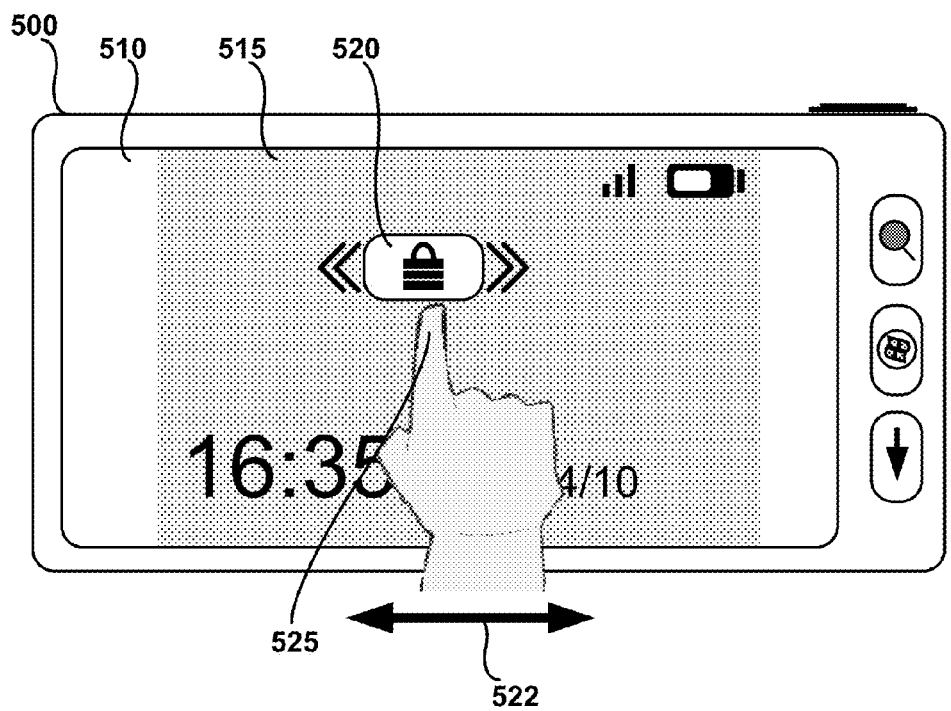
FIG. 5A illustrates a generalized example of a mobile device while presenting a lock screen.
Figure 5B:
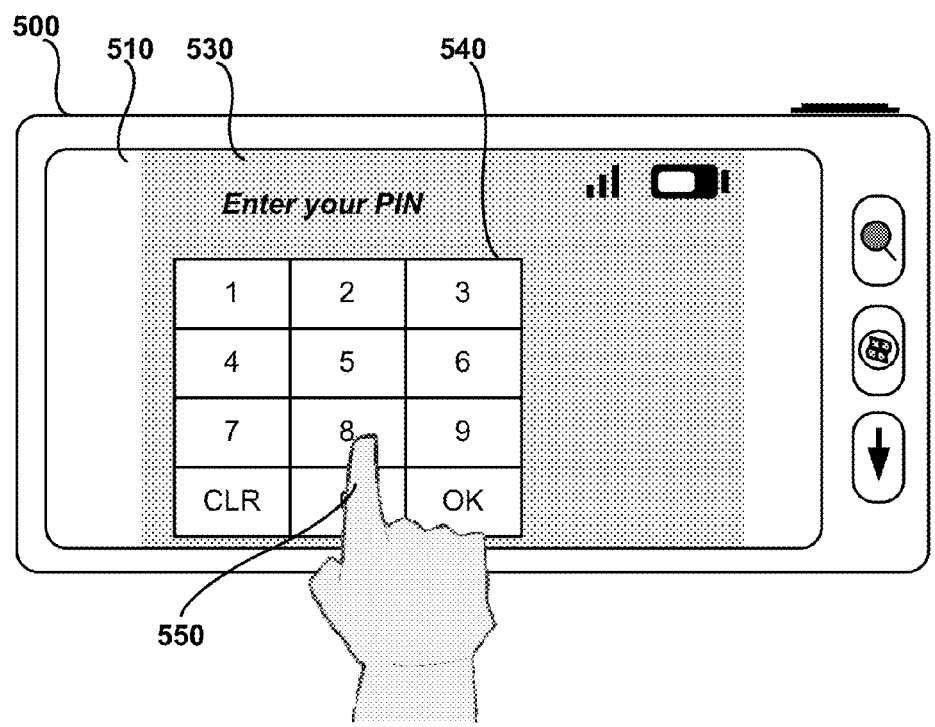
FIG. 5B illustrates a generalized example of a mobile device presenting an authentication user interface.

FIG. 5A depicts a mobile device 500 having a touch screen display 510, which is displaying a lock screen 515, including an unlock slider control 520. A mobile device user can slide/drag a finger 525 in the direction indicated by the arrows displayed with the unlock slider control 520 (finger motion is in either of the directions indicated by the arrow 522) in order to request the device to present an authentication screen, for example, as shown in FIG. 5B. Although the authentication screen shown in FIG. 5B uses a PIN pad, other techniques can be used, for example, fingerprint or voice recognition.

FIG. 5B depicts the mobile device 500 of FIG. 5A after the user slides a finger on the unlock slider control 520. As shown, the mobile device 500 presents an authentication screen 530 including a PIN pad 540 on the touch screen display 510. The user can enter a PIN (e.g., a four-digit sequence of numerals) using a finger 550 on the pin pad 540. If the PIN entered matches a stored PIN, the user is successfully authenticated, and the device can enter a below-lock (unlocked) state.

VI. Example Invocation of Image-Capture Application in Above-Lock Mode

FIG. 6 is a flow chart 600 that outlines an exemplary method of receiving input data while in an above-lock state of a mobile device and invoking and executing an application in the above-lock state as can be used in certain embodiments of the disclosed technology.

At process block 610, input data is received requesting invocation of an application while a device is in an above-lock state. For example, a mobile device can receive input data from an input source such as one or more hardware buttons, a touch screen, one or more accelerometers, or a microphone. The application requested can include an image-capture application, such as a camera or video capture application, although other applications, such as voice recording, GPS, or other desired applications can be invoked and/or executed. The device can be set to be in the above-lock state using various techniques, including use of a timeout, a lock-out screen, etc. In some examples, the input data is received using a specified hardware button or key, for example, a camera button on a mobile phone. In other examples, a set of key presses or touch screen gestures can be used.

At process block 620, the application requested at process block 610 is invoked, although some functionality of the application is not provided as a result of the device being in an above-lock state. For example, if the requested application is an image-capture application, a subset of the normal application functionality is provided: zoom in, zoom out, shutter, and viewfinder options. Even though the application has been invoked, other functions that are normally available in below-lock mode are not made available. For example, image-capture application functionality such as sending a captured image via email, or other applications or functions normally available on the mobile device, such as email, browser, contacts, and making outgoing calls, are prevented from being accessed. Thus, a mobile device user is provided with functionality useful for immediately capturing an image with the device, but not functionality that is not useful for image capture, or that could compromise the privacy of the mobile device's primary user.

At process block 630, additional input data is received requesting an unavailable function on the mobile device. For example, a request to send the image as an attachment, request to use the camera roll, or a request to view the mobile device contact list is received. The device remains in the above-lock state, and proceeds to process block 640.

At process block 640, as a result of the device receiving a request for an unavailable function, an authentication user interface is presented to the user to enter authentication credentials to unlock the device. For example, the user might be prompted to enter a PIN number using the mobile device touch screen, press a key combination (such as "Call" and "*"), enter a password, or provide fingerprint or voice data for authentication. In some examples, after receiving authenticating input, the mobile device can proceed directly to the functionality requested at process block 630, instead of presenting the regular device home screen.

VII. State Diagram for an Example Mobile Device

FIG. 7 is a state diagram 700 that outlines several states of an exemplary mobile device in accordance with certain embodiments of the disclosed technology. At lock screen state 710, the mobile device is at a lock screen in an above-lock state. While at lock screen state 710, the mobile device can exhibit multiple behaviors consistent with a lock screen, such as displaying a lock screen as shown in FIG. 5A, displaying a blank screen or wallpaper, or powering off the mobile device display and/or other selected features or components (e.g., if the mobile device is in a standby state or a low-power state).

At transition 712, input data is received requesting invocation of an application, for example, invocation of an image-capture application such as a digital camera or digital video camera application in an above-lock state. Several input methods for creating input data requesting invocation of an application, consistent with the goals of allowing fast access to a camera application while preventing accidental triggering of the camera or unnecessary power consumption, are available, including the following examples.

A first option, dubbed "Camera Button Press & Hold," involves a mobile device user pressing and holding a dedicated hardware camera button connected to the mobile device while the mobile device is in an above-lock mode for a predetermined time (e.g., for one second). The predetermined time is used to mitigate accidental launches of the camera when the device is in, for example, a user's handbag or pocket. As discussed further below, in some examples, a proximity sensor can also be employed to mitigate accidental launch. In some examples, an image-capture device (such as a camera) can be used to supplement, or be used instead of, a proximity sensor to determine whether objects are in proximity with the mobile device.

When the end user presses and holds the camera button, a camera application (e.g., an image-capture application) is launched and a live viewfinder appears on the mobile device display screen. After the viewfinder is available, the user can release the camera button, after which time above-lock viewfinder functionality is made available. For example, a user can then provide a half press on the camera button to auto-focus the image displayed in the viewfinder, or provide a full press on the camera button to capture an image. In some examples, the mobile device can provide feedback by vibrating the mobile device chassis or vibrating a mobile device button, e.g., by vibrating the camera shutter button. By providing vibration feedback, a user who has intentionally pressed the camera shutter button receives haptic feedback that the above-lock camera application has launched and is ready to capture an image. For an unintentional button press, the mobile device user is thereby alerted that the camera application has been launched inadvertently (e.g., by the button being inadvertently pressed while in a user's pocket or handbag) and thus the user can take action to reposition the mobile device to avoid such inadvertent invocations or return the mobile device to a standby state.

A second option, dubbed "Camera Button Press with Touch Based User Interface Confirmation," involves a mobile device user pressing the camera button while the mobile device is in an above-lock mode, after which the mobile device presents a confirmation user interface on the screen requesting confirmation that the user actually intends to use the camera. For example, after receiving a camera button press, the mobile device displays a camera icon on the mobile device touch screen, and the user touches the touch screen over the camera icon (e.g., touch screen camera button 234) to confirm the user's intent to use the camera application. After receiving a successful confirmation, an application (e.g., an image-capture application) is launched and a live viewfinder appears on the mobile device display screen. After the viewfinder is available, the user can, for example, capture images or auto-focus images in the viewfinder in a similar manner as with Camera Button Press & Hold.

A third option, dubbed "Key Combination Press," involves a mobile device user pressing and holding a camera button and one or more other buttons (e.g., a power button 220) simultaneously for at least a predetermined duration (e.g., one second). After a press and hold of these two buttons is detected, the mobile device launches the camera application and the live viewfinder is displayed on the screen. After receiving a successful confirmation, a camera application (e.g., an image-capture application) is launched and a live viewfinder appears on the mobile device display screen. After the viewfinder is available, the user can capture images or auto-focus images in the viewfinder in a similar manner as with Camera Button Press & Hold.

As will be readily understood by a person of ordinary skill in the art, the three options for creating input data discussed above have varying advantages and attributes that can be selected in order to achieve a desired user experience. For example, the "Camera Button Press & Hold" option allows for single-handed control of a mobile device, which advantageously allows a user to keep one hand free while using the camera. The "Camera Button Press with Touch Based User Interface Confirmation" provides additional security against accidental triggering of the camera application, but might be more difficult for some users to perform with a single hand. In addition, providing the confirmation user interface allows the mobile device to distract the user during a delay as the image-capture application is launched, thus providing a more pleasant user experience. The "Key Combination Press" option also provides additional security against additional invocations of the camera application, but might be more difficult for some users to perform with a single hand. In addition, this option involves design decisions regarding placement of the two or more buttons on the mobile device Regardless of the input method used, after receiving input data requesting invocation of an application, the mobile device enters state 720, the above-lock camera viewfinder mode. If the device is in a standby, sleep, or other low-power mode, the mobile device is also waked from that state before launching the application. It is noted that the requirement for a camera button press to wake the mobile device may create power supply or other design issues to be addressed in designing the physical chassis for the mobile device. Furthermore, when launching the requested application in an above-lock state, other applicable device management policies or restrictions can continue to be honored by the device.

While in camera viewfinder mode in the above-lock state, the user is presented with only a subset of the full functionality of the image capture application. For example, the user may be presented with functions to capture an image, switch between still photograph and video mode, zoom in/out, or image capture options, including adjusting the camera autofocus mode, image white balance, flash on/off, image effect, or other such functions suitable for non-private use. In some examples, functions that are not made available to the user can include functions for viewing previously-captured images, sending images, uploading images, or other such functions less suitable for non-private use (e.g., unauthorized use by an unknown or untrusted user). Thus, mobile device functions that could reveal sensitive or private data are hidden from unknown or untrusted users, while still allowing fast capture using functions suitable for non-private use.

In some examples, the viewfinder functionality in an above-lock state can be simplified such that more novice guest users, who may be unfamiliar with a particular mobile device, are not distracted by more complex options, such as viewing and adjusting image histograms, shutter speed, photo sensor sensitivity (e.g., ISO sensitivity), aperture, or image quality.

The device can also transition 716 back to the lock screen state 710 if, for example, the device does not receive input after a specified time period, or the user presses a designated key (e.g., the power button).

At state 720 (above-lock camera viewfinder mode), if input data is received requesting image capture (transition 722) by, for example, pressing a camera button coupled to the mobile device (e.g., camera button 224), then the mobile device captures one or more still photo images or video, and enters state 730, for above-lock post-capture mode.

At state 730, the mobile device is in an above-lock camera post-capture mode, during which a confirmation image is displayed, and the user is presented with a subset of the full functionality of the image capture capabilities. For example, the user may be presented with functions to zoom in/out of the confirmation image, or view image properties such as the aperture or shutter speed used to capture the current image. Functions that are not available to the user can include functions for deleting the captured image or other previously captured images, sending or uploading captured images to the computing cloud, using the captured image as home screen wallpaper, or other such private functions. In some examples, the mobile device uses a "camera roll" metaphor (e.g., displaying images in a strip similar to a traditional film camera), as discussed above in FIG. 3B and accompanying text. Using a camera roll allows a user to swipe a finger across a touch screen and thereby move the image in the direction of the swipe (or a drag or flip) and allows a user to see previously taken photos. In some examples, the confirmation image can be deleted during a predetermined time period, after which the image is added to the camera roll with other previously captured images. In some examples, the most recent and other images cannot be deleted in above-lock mode after being added to the camera roll. In some examples, the camera roll ability is disabled in above-lock mode, and if such input is received, the mobile device transitions 732 to the mobile device unlock user interface state 740.

After receiving input data to return to the viewfinder, or simply waiting for a predetermined amount of time (e.g., five seconds), the mobile device follows transition 726 to return to the above-lock camera viewfinder state 720. However, if other input is received (e.g., by requesting one of the functions not available to the user by pressing a button other than the camera button and/or power button, or attempting to use the camera roll, or the user explicitly requests to unlock the device), the mobile device transitions 732 to mobile device unlock user interface state 740.

At state 740, the mobile device presents an unlock user interface to the user. For example, the user might be prompted to enter a PIN number using the mobile device touch screen, press a key combination (such as "Unlock" and "*"), or provide a finger print or voice recognition. If the mobile device is successfully unlocked, the mobile device state is changed to state 750 or 760, depending on how state 730 was entered.

The user can also enter state 740 directly from the mobile device lock screen state 710. For example, while presenting the lock screen, receiving specified input (e.g., receiving a press on a power button, receiving a press on any key, or other predetermined input) transitions the device via transition 742 to state 740. In this case, if the mobile device is unsuccessful in authenticating a user, the device follows transition 746 back to state 710, remaining in an above-lock mode throughout. If the mobile device successfully authenticates a user, then the device state changes to below-lock mode, and the device transitions to the mobile device normal home screen at state 760.

If instead the user enters state 740 from above-lock camera post-capture mode (state 730), then the user is presented with a similar lock screen, and the mobile device attempts to authenticate a user using similar methods as described above. If the mobile device cannot authenticate the user, or the user presses the power button, then the device transitions to state 710 and presents the mobile device lock screen. In other examples, the device transitions 734 back to state 730 (above-lock post-capture viewfinder mode). Alternatively, if the mobile device successfully authenticates the user, then the device does not transition to state 760, but instead follows transition 736 to state 750 to enter camera post-capture mode in the below-lock state. Thus, a user that enters the lock screen from an above-lock post capture mode is placed in the below-lock post-capture mode after authentication. This avoids the inconvenience of the user having to find their way back to the image-capture application after authenticating. In some examples, the user returns to the viewfinder state 770 in a similar state as it was before the lock screen, with the camera roll in a similar state, similar zoom options, etc.

In some examples, the mobile device also includes a timeout period (e.g., one minute) for one or more of the above-lock states 710, 720, 730, and 740. If the mobile device does not detect user activity before the timeout period expires, the device transitions back to the locked and/or sleep state (or other low-power state). However, in some examples, if video recording is in progress, the camera does not enter the locked and/or sleep states, but instead can continue recording beyond the expiration of the timeout period.

At state 760, the user has transitioned from the mobile device unlock user interface state 740 and is presented with a top-level home screen for the device. That is, a user at state 760 can invoke mobile device applications, such as an image-capture application, by using menus associated with the home screen, or by pressing the image-capture button.

At state 770, the mobile device has entered a camera viewfinder in below-lock mode, by, for example, transition 762 from state 760 or transition 776 from state 750. The below-lock mode viewfinder at state 770 includes a larger set of functions. For example, functions described above regarding 720 as being inaccessible such as deleting images, sending images, uploading images, and viewing previously stored images can now be accessed. Potentially complex or confusing viewfinder-specific functions, such as setting camera settings, including ISO sensitivity, aperture, shutter speed, and the like, can additionally be made available to the user. Since a user who has unlocked the device is likely to be the owner of the mobile device, these additional features can be provided with less risk of confusing or overwhelming the user. The device can return to the home screen state 760 by providing input or after expiration of a timeout period. The mobile device can also transition 766 back to the home screen in a similar manner as with transition 716.

At state 750, the mobile device is in camera post-capture below-lock mode. Here, additional functionality can be provided, such as additional functions for deleting images, sending images, uploading images, and viewing previously-stored images. After receiving user input to return to the viewfinder, or the expiration of a timeout period, the mobile device returns to state 770. In addition, the device can transition 772 from state 770 in a similar manner as transition 722, and also transition 776 in a similar manner as state 726, as discussed above.

As will be understood by one of ordinary skill in the art, the state diagram depicted in FIG. 7 is a representative embodiment, but alternative combinations, additions, and deletions can be made within the scope and spirit of the invention. For example, some examples include utilizing a proximity sensor in conjunction with other input data for performing the state transitions, as discussed below in FIG. 9 and accompanying text. Some examples do not include a transition 722 to a post-capture mode when in above-lock mode. In those examples, the device instead transitions 716 back to the lock screen state 710.

VIII. Example Invocation of Image-Capture Application in Above-Lock Mode

Figure 8:
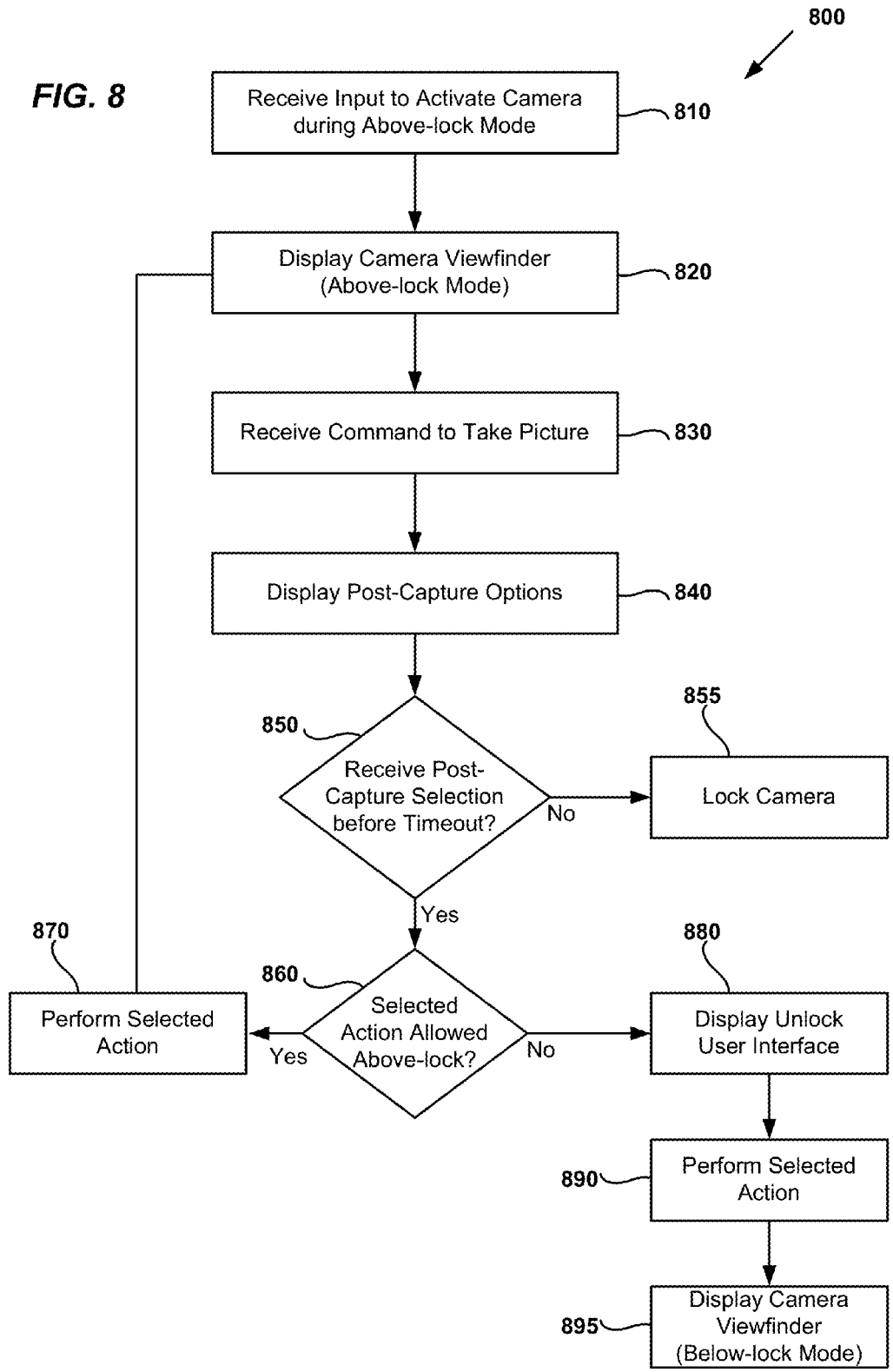
FIG. 8 is a flow chart that further details the exemplary implementation illustrated in FIG. 6.

FIG. 8 is a flow chart 800 of another, more detailed, exemplary method of receiving input data while a mobile device is in an above-lock state and invoking an image-capture application as can be used in embodiments of the disclosed technology.

At process block 810, input data is received to activate an image-capture application while in lock mode. The input data can come in various forms, including, for example, Camera Button Press & Hold, Camera Button Press with Touch Based User Interface Confirmation, or Key Combination Press, as discussed further above. As the method proceeds to process block 820, haptic feedback, such as vibration of one or more camera buttons, or an actuator connected to a mobile device, can be provided by activating one or more such actuators to vibrate one or more of the buttons or the entire chassis of the device. In some examples, and as described further above, the method can also use a proximity sensor to determine whether to provide such feedback, or whether to proceed to process block 820.

At process block 820, a camera viewfinder associated with the image-capture application is displayed with a limited number of functions in above-lock mode.

At process block 830, second input data is received to capture an image via, for example, a camera shutter button. After capturing an image, the method proceeds to process block 840.

At process block 840, a set of one or more post-capture controls are presented to the user for selecting a post-capture function. For example, the user may be presented with functions to zoom in/out of the capture image, or view image properties such as aperture or shutter speed that were used to capture the image. Functions that are not available to the user can include functions for deleting the captured image or other previously-captured images, sending or uploading images to a server in a computing cloud, or using the captured image as phone wallpaper.

At process block 850, the method evaluates whether a post-capture input selection is received before a predetermined timeout period (e.g., five seconds) expires. If the timeout period expires, the method proceeds to process block 855, where the mobile device is placed in a locked mode, which can include being placed in a low-power or other standby state. If a post-capture input data selection is received before the timeout period expires, the method proceeds to process block 860.

At process block 860, a check is performed to determine if the selected post-capture action is allowed while the device is in an above-lock mode. If so, the method proceeds to process block 870, where the selected action is performed, and then returns to display the camera viewfinder at process block 820. If the post-capture action is not allowed, the method proceeds to process block 880.

At process block 880, an unlock screen is displayed to the user. The user then attempts to unlock or authenticate using the interface provided by the unlock screen. If the authentication is successful, then the device is placed in below-lock mode, and the method proceeds to process block 890.

At process block 890, the selected action is performed, and the method proceeds to process block 895. The selected action can be performed, and the method can proceed to process block 895, without requiring intervening input, such as selections from a home screen or other mobile device menus. At process block 895, the device displays the camera viewfinder, but because the mobile device is now in below-lock mode, the viewfinder can display additional controls for functions that are only available in below-lock mode. For example, functions not available in the above-lock viewfinder such as deleting images, sending images, uploading images, and viewing previously stored images can now be accessed.

IX. State Diagram for an Example Mobile Device

Figure 9:
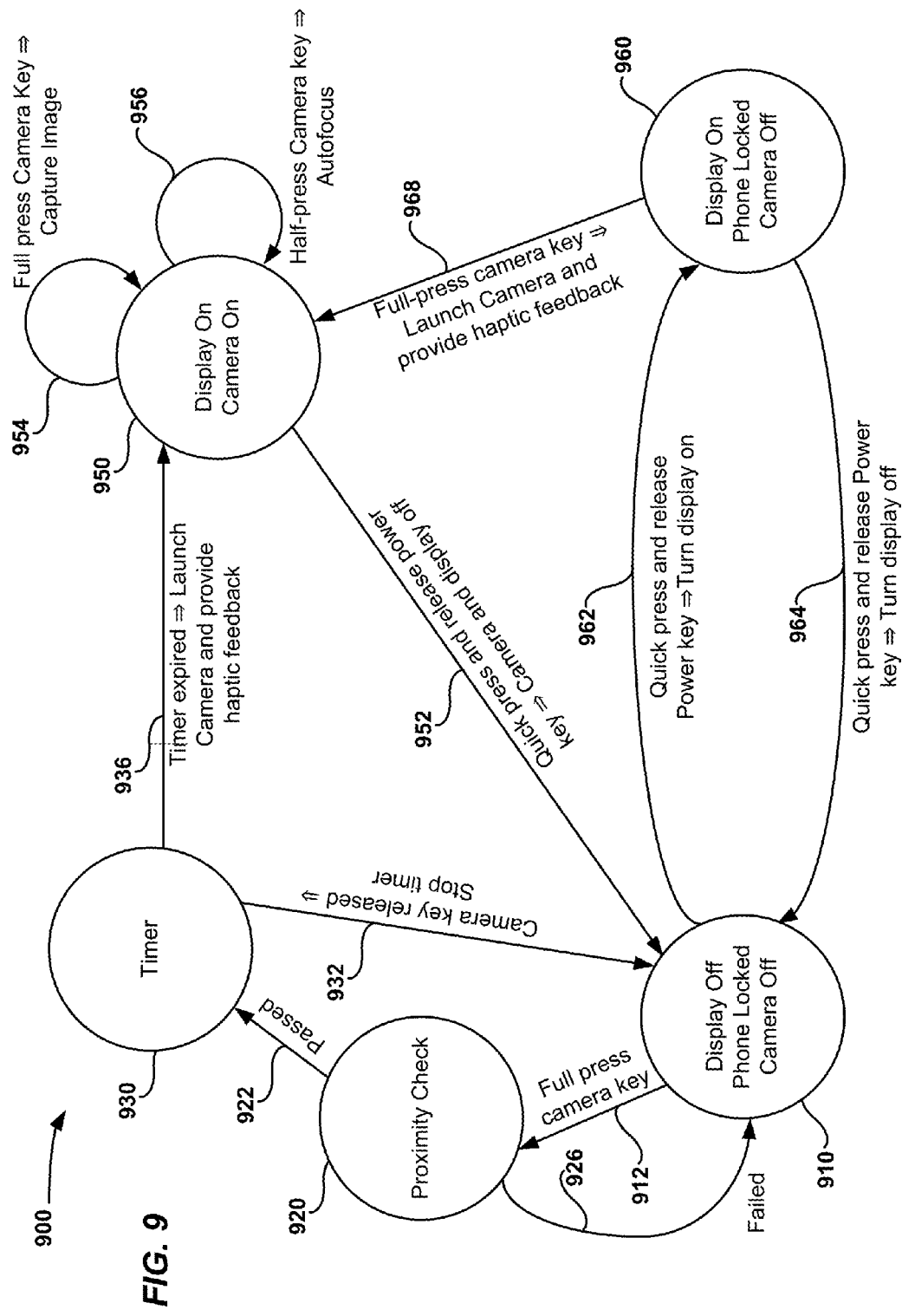
FIG. 9 is a state diagram that outlines an aspect of the disclosed technology including the use of a proximity sensor.

FIG. 9 is a state diagram 900 that outlines several states of an exemplary mobile device incorporating a proximity sensor and/or light sensor in accordance with the disclosed technology. Using a proximity sensor and/or light sensor coupled to a mobile device can assist in determining if an object is in proximity with the device (e.g., the mobile device is in a user's pocket or handbag). By preventing invocation of an image capture application, the risk of accidental capture can be mitigated. At state 910, a handheld phone coupled with a proximity sensor and a camera is in an above-lock standby state, with its display turned off and camera application turned off. If a full-press (as discussed above in FIG. 2A and accompanying text) of the camera key is detected, the phone transitions 912 to state 920, where one or more proximity sensors determine whether an object is in proximity with one or more of the sensors. If the proximity check fails 926 (e.g., a nearby object is detected), the device transitions back to state 910, returning to the above-lock standby state. If the proximity check passes (e.g., a nearby object is not detected), the device transitions 922 to state 930, where a tinier waits for a predetermined period of time (e.g., one second). If the camera key is released during the time period, the device transitions 932 back to state 910, and returns the device to a standby mode. If the camera key is not released during the time period, then the device launches a camera application and transitions to state 950. In some examples, haptic or other forms of feedback are provided to the user. For example, as discussed above regarding process blocks 810 and 820, haptic feedback is created by activating a piezoelectric actuator coupled with the camera shutter button or the mobile device chassis for alerting the user that the camera application has been invoked, as well as to alert the user to a possibly inadvertent camera application launch.

At state 950, a camera application is invoked in view-finder mode. This includes turning on one or more displays coupled to the device, and preparing the camera to capture an image. In some examples, images being received by the camera are displayed live on the display. While at state 950, the device waits until it receives a half press or full press of the camera key. If a half press is detected, the device autofocuses the camera and returns 956 to state 950. If a full press of the camera key is detected, the device captures an image and proceeds 954 to a post-capture mode (not shown) before returning to state 950. If a quick press and release of the power key is detected, the camera and display(s) of the device are turned off, and the device transitions 952 to state 910.

Other state transitions can be realized from state 910 using the power key. For example, if a quick press and release of the power key is detected, the device turns the display on and transitions 962 to state 960. At state 960, the camera display is on, but the device is locked and its camera is turned off. If a full press of the camera key is detected, the device launches the camera and transitions 968 to state 950. Alternatively, if a quick press and release of the power key is detected, the display is turned off, and the device transitions 964 to state 910, where the image-capture module and/or image-capture applications are put into sleep mode.

In some examples, the camera application includes additional logic for handling key debounce situations to prevent prolonged or repeated use of the proximity sensor or camera driver. An example of such a debounce situation is when the camera button is held down accidentally for a prolonged period (e.g., 30 seconds). Another example of such a debounce situation is when the camera button is accidentally pressed down at regular intervals repeatedly. In some examples, the mobile device can provide haptic feedback, such as by activating an actuator coupled to one or more of the mobile device buttons or to the mobile device chassis, in order to alert the user that the mobile device may be launching the camera application inadvertently.

In some examples, the mobile device includes additional functionality for aiding users in discovering above-lock camera features. For example, upon the first attempt to launch (e.g., the first launch ever for a given instance of a mobile device) an image-capture application in an above-lock state, the mobile device immediately causes the unlock screen to be deployed. Thus, after purchasing a new mobile device, the user has to use an image-capture application at least once before the application can be used in an above-lock state. As another example, if the device is not locked using a PIN or other identification authentication (e.g., a touch-screen mobile device can be unlocked with a key combination press, or by physically opening devices with a clam-shell form factor), then launching an image-capture application will automatically "unlock" the phone. In some examples, where the mobile device is not locked using a PIN or other personal identification, calling the unlock screen API (e.g., when the user swipes to enter the camera roll) will immediately return the user to the corresponding below-lock state, without showing an unlock user interface.

X. Example Power Supply for a Mobile Device

Figure 10:
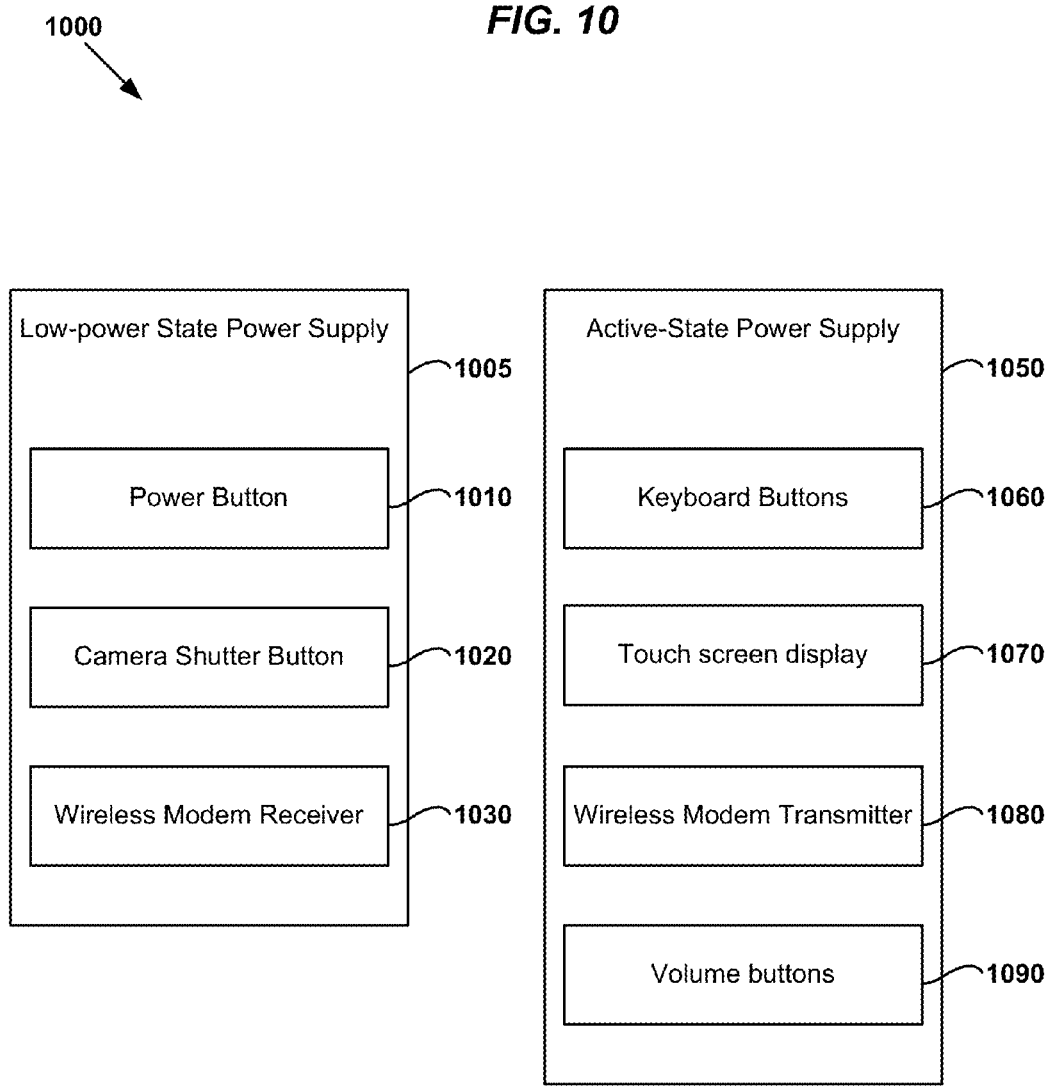
FIG. 10 is a block diagram illustrating multiple power supplies of a mobile device.

FIG. 10 is a block diagram 1000 illustrating two power supplies: a low-power state power supply 1005, which powers mobile device components when a mobile device is in a low-power or active state, and an active-state power supply 1050, which powers mobile device components when the device is in an active power state, but powers-down the associated device components when the device is in a low-power state. As shown, the components powered in the low-power state include a power button 1010, camera shutter button 1020, and a wireless modem receiver 1030. Thus, only a subset of mobile devices components is powered and functional when the device is in the lower power state.

Additional components, including other keyboard buttons 1060, a touch screen display screen 1070, a wireless modem transmitter 1080, and volume buttons 1090 are powered by the active state power supply 1050, so that the components can be powered-down when the mobile device is in a standby state.

XI. Other Exemplary Computing Environments

Figure 11:
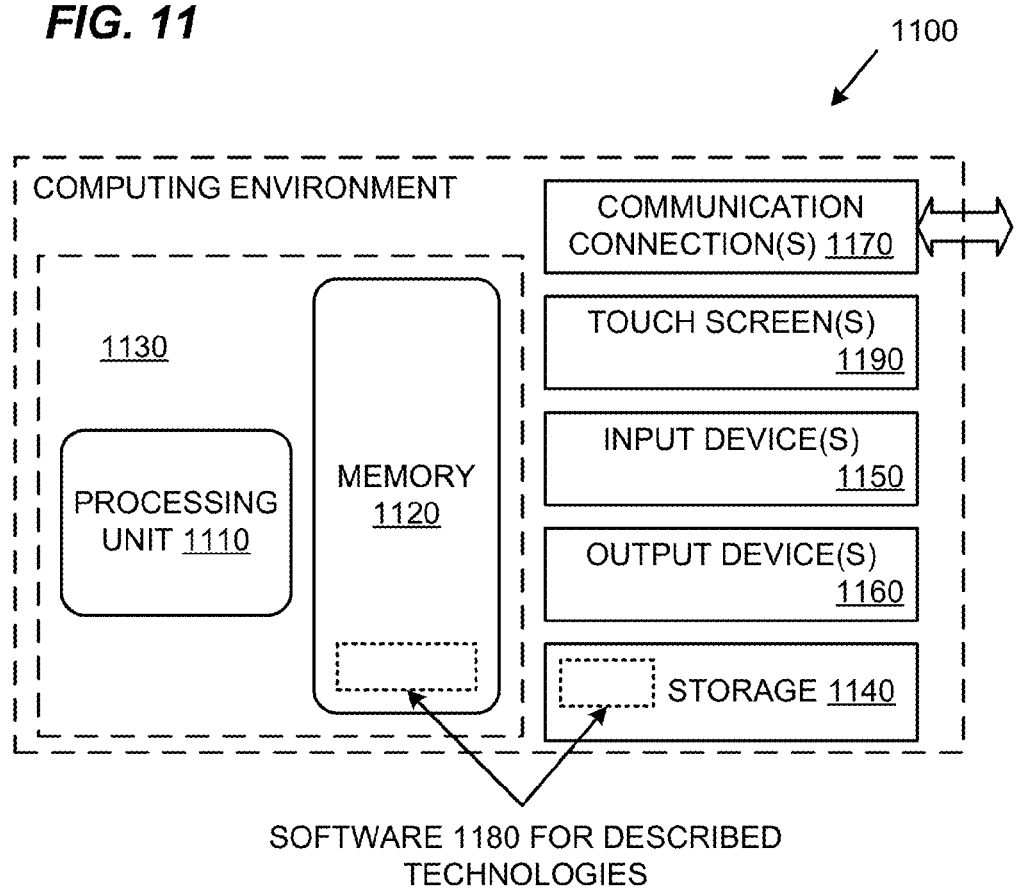
FIG. 11 illustrates a generalized example of a suitable computing environment in which described embodiments, techniques, and technologies can be implemented.

FIG. 11 illustrates a generalized example of a suitable computing environment 1100 in which described embodiments, techniques, and technologies may be implemented. For example, the computing environment 1100 can implement an above-lock image-capture application, a below-lock image-capture application, and a proximity sensor checking application, as described above.

The computing environment 1100 is not intended to suggest any limitation as to scope of use or functionality of the technology, as the technology may be implemented in diverse general-purpose or special-purpose computing environments. For example, the disclosed technology may be implemented with other digital camera devices or computer system configurations, including handheld devices, multi-processor systems, microprocessor-based or programmable consumer electronics, network PCs, minicomputers, main-frame computers, and the like. The disclosed technology may also be practiced in distributed computing environments where tasks are performed by remote processing devices that are linked through a communications network. In a distributed computing environment, program modules or instructions may be located in both local and remote memory storage devices.

With reference to FIG. 11, the computing environment 1100 includes at least one central processing unit 1110 and memory 1120. In FIG. 11, this most basic configuration 1130 is included within a dashed line. The central processing unit 1110 executes computer-executable instructions and may be a real or a virtual processor. In a multi-processing system, multiple processing units execute computer-executable instructions to increase processing power and as such, multiple processors can be running simultaneously. The memory 1120 may be volatile memory (e.g., registers, cache, RAM), non-volatile memory (e.g., ROM, EEPROM, flash memory, etc.), or some combination of the two. The memory 1120 stores software 1180 that can, for example, implement the technologies described herein. A computing environment may have additional features. For example, the computing environment 1100 includes storage 1140, one or more input devices 1150, one or more output devices 1160, one or more communication connections 1170, and one or more touch screens 1190. An interconnection mechanism (not shown) such as a bus, a controller, or a network, interconnects the components of the computing environment 1100. Typically, operating system software (not shown) provides an operating environment for other software executing in the computing environment 1100, and coordinates activities of the components of the computing environment 1100.

The storage 1140 may be removable or non-removable, and includes magnetic disks, magnetic tapes or cassettes, CD-ROMs, CD-RWs, DVDs, or any other non-transitory storage medium which can be used to store information and that can be accessed within the computing environment 1100. The storage 1140 stores instructions for the software 1180, which can implement technologies described herein.

The input device(s) 1150 may be a touch input device, such as a touch screen, keyboard, keypad, mouse, pen, or trackball, a voice input device, a scanning device, proximity sensor, image-capture device, or another device, that provides input to the computing environment 1100. For audio, the input device(s) 1150 may be a sound card or similar device that accepts audio input in analog or digital form. The output device(s) 1160 may be a display, touch screen, printer, speaker, CD-writer, or another device that provides output from the computing environment 1100. The touch screen 1190 can act as an input device (e.g., by receiving touch screen input) and as an output device (e.g., by displaying an image capture application and authentication interfaces).

The communication connection(s) 1170 enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment 1100. By way of example, and not limitation, with the computing environment 1100, computer-readable media include memory 1120 and/or storage 1140. As should be readily understood, the term computer-readable storage media includes non-transitory storage media for data storage such as memory 1120 and storage 1140, and not transmission media such as modulated data signals.

XII. Example Mobile Device Network Environments

Figure 12:
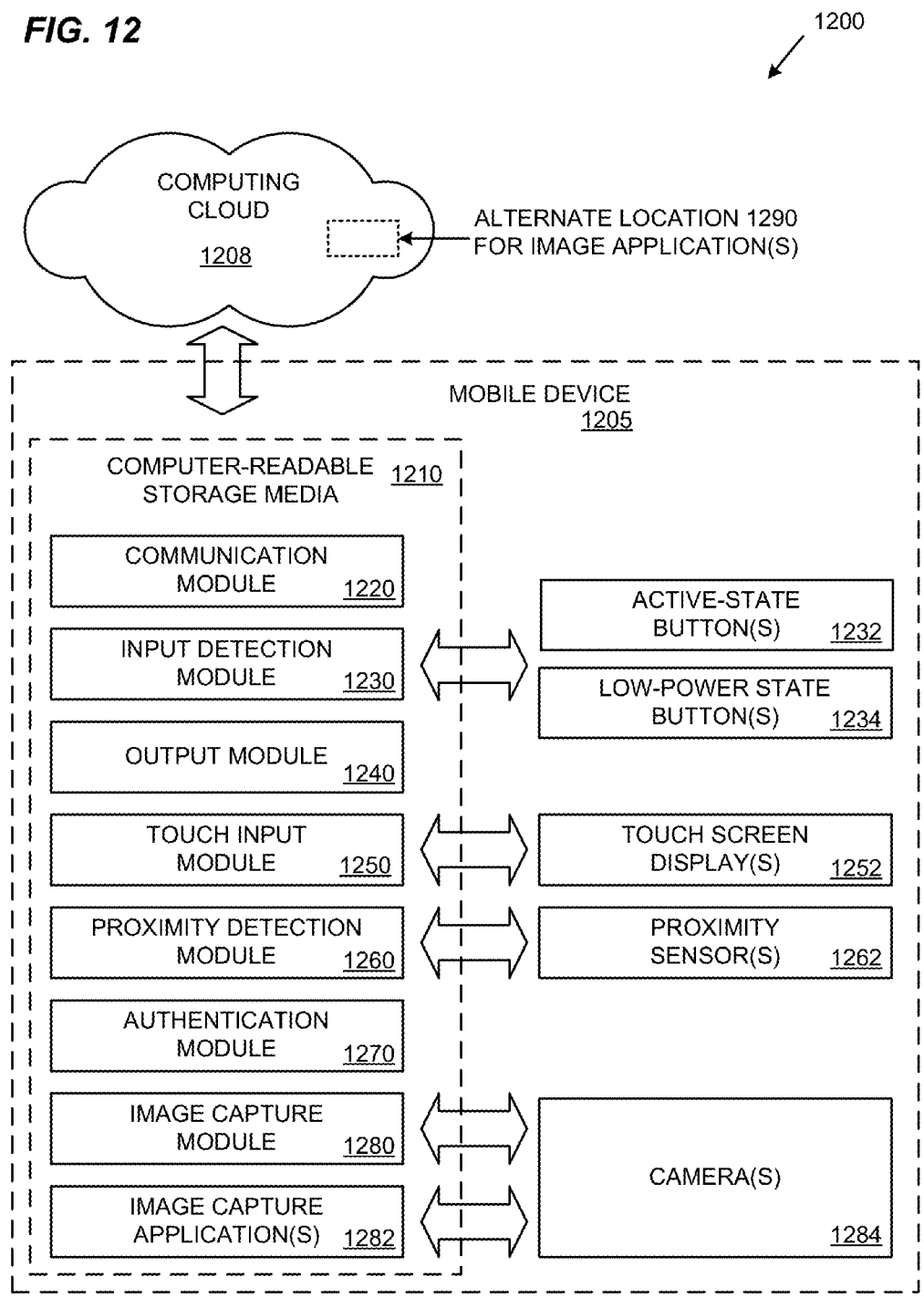
FIG. 12 is a block diagram illustrating a mobile device comprising various modules stored on a computer-readable storage medium for invoking and executing image-capture applications in above-lock or below-lock states.

FIG. 12 illustrates a generalized example of a suitable implementation environment 1200 for a mobile device 1205 connected to a computing cloud 1208. The mobile device 1205 includes several modules including computer-readable instructions stored on one or more computer-readable storage media 1210, including an input detection module 1230 for receiving input, a touch input module 1250 for receiving touch screen input from one or more touch screen displays 1252, and an output module 1240 for providing output to a touch screen, a speaker, and/or a piezoelectric transducer. The input detection module 1230 can be configured to receive input from one or more low-power state buttons 1234 when the mobile device 1205 is in a low-power or active power state, as well as receive input from one or more active-state buttons 1232 when the mobile device is in an active power state. A communication module 1220 adapts the mobile device 1205 so that it can communicate with service providers located in the computing cloud 1208 (e.g., using a suitable wired or wireless communication protocol and network).

The one or more computer-readable storage media 1210 also includes an authentication module 1270 for authenticating a user using a lock-screen user interface, a proximity detection module 1260 for detecting objects in proximity of one or more proximity sensors 1262, image capture module 1280, and one or more image-capture applications 1282. The image-capture module 1280 and/or one or more image-capture applications 1282 are coupled to an image-capture device (e.g., camera 1284). In some examples, the image capture module provides functionality such as a camera viewfinder using the touch screen display 1252, while the image-capture applications 1282 provide functionality such as uploading or sending capture images to the computing cloud 1208. In some embodiments, all or a portion of the authentication module, image capture module, and/or image applications can be provided by a service provider in an alternate location 1290 in the computing cloud 1208.

Figure 13:
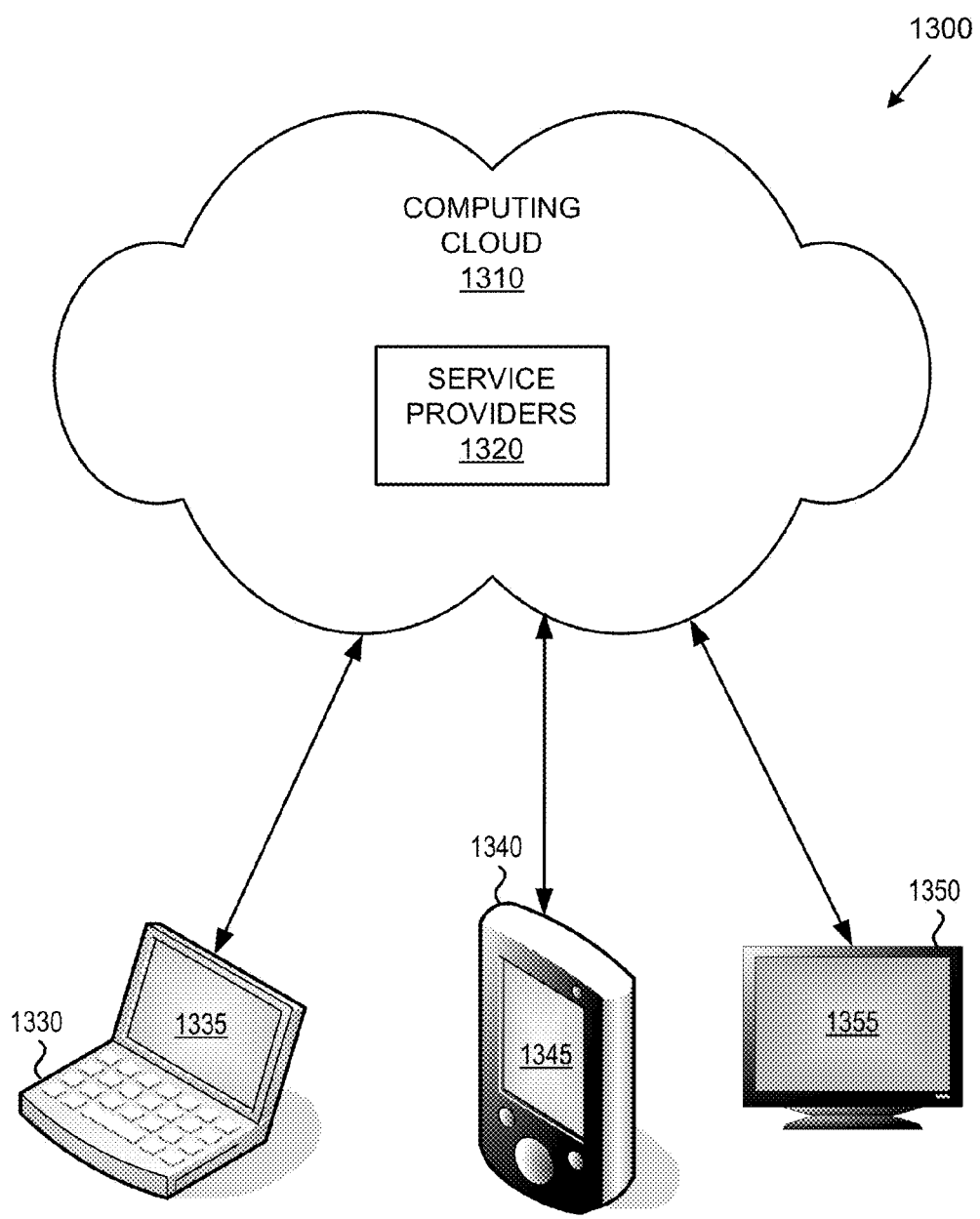
FIG. 13 illustrates a generalized example of a suitable implementation environment for a mobile device connected to a computing cloud.

FIG. 13 illustrates another generalized example of a suitable implementation environment 1300 in which described embodiments, techniques, and technologies can be implemented.

In example environment 1300, various types of services (e.g., computing services) are provided by a computing cloud 1310. For example, the computing cloud 1310 can comprise a collection of computing devices, which can be located centrally or distributed, that provide cloud-based services to various types of users and devices connected via a network such as the Internet. The implementation environment 1300 can be used in different ways to accomplish computing tasks. For example, some tasks (e.g., processing user input and presenting a user interface) can be performed on local computing devices (e.g., connected devices 1330, 1340, 1350) while other tasks (e.g., storage of data to be used in subsequent processing) can be performed in the computing cloud 1310.

In example environment 1300, the computing cloud 1310 provides services for connected devices 1330, 1340, and 1350 with a variety of screen capabilities. Connected device 1330 represents a device with a computer screen 1335 (e.g., a mid-size screen). For example, connected device 1330 could be a personal computer such as desktop computer, laptop, notebook, netbook, or the like. Connected device 1340 represents a device with a mobile device screen 1345 (e.g., a small size screen). For example, connected device 1340 could be a mobile phone, smart phone, personal digital assistant, tablet computer, and the like. Connected device 1350 represents a device with a large screen 1355. For example, connected device 1350 could be a television screen (e.g., a smart television) or another device connected to a television (e.g., a set-top box or gaming console) or the like. One or more of the connected devices 1330, 1340, and 1350 can include touch screen capabilities. Touchscreens can accept input in different ways. For example, capacitive touchscreens can detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1300. For example, the computing cloud 1310 can provide services for one or more computers (e.g., server computers) without displays.

Services can be provided by the computing cloud 1310 through service providers 1320, or through other providers of online services (not depicted). For example, cloud services can be customized to the screen size, display capability, and/or touch screen capability of a particular connected device (e.g., connected devices 1330, 1340, 1350).

In example environment 1300, the computing cloud 1310 provides the technologies and solutions described herein to the various connected devices 1330, 1340, 1350 using, at least in part, the service providers 1320. For example, the service providers 1320 can provide a centralized solution for various cloud-based services. The service providers 1320 can manage service subscriptions for users and/or devices (e.g., for the connected devices 1330, 1340, 1350 and/or their respective users).

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. The techniques and solutions described in this application can be used in various combinations to provide an improved user experience with mobile devices, including mobile devices such as smart phones.

Any of the methods described herein can be performed via one or more computer-readable media (e.g., storage or other tangible media) comprising (e.g., having or storing) computer-executable instructions for performing (e.g., causing a computing device to perform) such methods. Operation can be fully automatic, semi-automatic, or involve manual intervention.

Having described and illustrated the principles of our innovations in the detailed description and accompanying drawings, it will be recognized that the various embodiments can be modified in arrangement and detail without departing from such principles. For example, any technologies described herein for capturing still photos can also be adapted for capturing video. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims and their equivalents.

We claim:

1. A method of operating a mobile device having a plurality of authentication states, including an above-lock state and a below-lock state, the method comprising:
   receiving first input data from a hardware button coupled to a low-power state power supply of the mobile device, the first input data indicating a request for invocation of an application when the mobile device is in the above-lock state, wherein one or more functions of the requested application available in the below-lock state are unavailable while the mobile device is in the above-lock state;
   responsive to the receiving the first input data, invoking the requested application on the mobile device;
   responsive to receiving second input data requesting at least one of the unavailable functions, presenting an unlock user interface; and
   authenticating a user of the mobile device with the unlock user interface and changing the state of the mobile device from the above-lock state to the below-lock state.

2. The method of claim 1, wherein the unavailable functions comprise sending data using a network connection connected to the mobile device.

3. The method of claim 1, further comprising waking the mobile device from a standby state based on the receiving the first input data.

4. The method of claim 1, wherein the first input data is received as a result of a hardware button of the mobile device being depressed for a predefined duration.

5. The method of claim 1, wherein the first input data is received as a result of detecting that a hardware button of the mobile device is depressed and second input data being received after the detection of the hardware button depress.

6. The method of claim 1, wherein the first input data is received as a result of a hardware button of the mobile device being depressed concurrently with another button coupled to the mobile device.

7. The method of claim 1, further comprising:
   receiving second input data requesting at least one of the unavailable functions, and subsequent to the receiving the second input data, performing the changing the state of the mobile device.

8. The method of claim 1, wherein the hardware button is a camera shutter button.

9. One or more computer-readable storage devices or memory storing computer-readable instructions that when executed by a mobile device cause the mobile device to perform a method, the mobile device having a plurality of authentication states, including an above-lock state and an below-lock state, the mobile device having a plurality of power states, including a low-power state and an active-power state, the method comprising:
   receiving a first request from a hardware button coupled to a low-power state power supply of the mobile device, the first request being for execution of an application or function when the mobile device is in the above-lock state and the low-power state;
   responsive to receiving the first request, causing the mobile device to enter the active-power state and executing the requested application or function with the mobile device, wherein one or more functions of the requested application available in the below-lock state are unavailable while the mobile device is in the above-lock state;
   receiving a second request for one or more of the functions unavailable in the above-lock state; and
   responsive to the receiving the second request, presenting a lock screen that can be used to change the mobile device to the below-lock state.

10. The computer-readable storage devices or memory of claim 9, wherein the method further comprises, based on receiving authenticating input, changing the state of the mobile device from the above-lock state to the below-lock state; and wherein at least one of the unavailable functions are made available in the below-lock state.

11. The computer-readable storage devices or memory of claim 9, wherein the method further comprises:
if the mobile device does not detect user activity before a predetermined timeout period expires, then transitioning the mobile device back to the above-lock state.

12. The computer-readable storage devices or memory of claim 9, wherein the second request is received with a touch screen display.

13. The computer-readable storage devices or memory of claim 9, wherein the second request is received via a voice recognition or voice recording application.

14. An apparatus, comprising:
one or more input sources;
one or more processors; and
a low-power state power supply, the low-power state power supply being electrically connected to a first hardware button configured to send a first signal requesting that the apparatus enter an active power state and a second hardware button configure to send a second signal requesting that the apparatus enter the active power state and invoke a requested function;
an active-state power supply configured to provide power for the requested function in the active power state but not in the low-power state; and
one or more computer-readable media storing computer-readable instructions that when executed by the processors, cause the apparatus to perform a method of invoking the requested function, the instructions comprising:
instructions for receiving input data from the input source,
instructions for locking and unlocking the apparatus using authentication, and
instructions for, responsive to receiving the second signal, invoking the requested function.

15. The apparatus of claim 14, wherein:
the low-power state power supply is electrically connected to a wireless modem receiver; and
the active-state power supply is electrically connected to a touch screen display and a wireless modem transmitter.

16. The apparatus of claim 14, wherein the requested function includes at least one or more of the following: wake phone, GPS data, auto upload data to cloud, or keep GPS data with uploaded documents.

17. The apparatus of claim 14, wherein the requested function is determined by privacy options that can be configured by a user of the apparatus, and wherein the requested function includes at least one or more of the following: wake phone, GPS data, auto upload data to cloud, or keep GPS data with uploaded documents.

18. The apparatus of claim 14, wherein the instructions further comprise:
instructions for, if the apparatus is locked, invoking the instructions for unlocking the apparatus using authentication.

19. The apparatus of claim 14, wherein the instructions further comprise:
instructions for, if the apparatus is locked, invoking the instructions for unlocking the apparatus using authentication; and
after the unlocking the apparatus, providing the requested function as if the requested function was invoked when the device was unlocked.

20. One or more computer-readable storage devices or memory storing computer-readable instructions that when executed by a mobile device cause the mobile device to perform a method, the method comprising:
executing an application or function for recording audio, images, and/or video when the mobile device is in an above-lock state;
receiving a request for one or more functions unavailable in the above-lock state;
responsive to the receiving the request, presenting a lock screen that can be used to change the mobile device to a below-lock state;
changing the mobile device to a below lock state; and
if the mobile device does not detect user activity before a predetermined timeout period expires, and the mobile device is recording audio and/or video, then remaining in the below-lock state.

21. A mobile device having a plurality of authentication states, including an above-lock state and an below-lock state, the mobile device having a plurality of power states, including a low-power state and an active-power state, the mobile device comprising:
one or more processors; and
one or more computer-readable storage devices or memory storing instructions that when executed with the processors, cause the mobile device to perform a method, the instructions comprising:
instructions to receive a first request from a hardware button coupled to a low-power state power supply of the mobile device, the first request being for execution of an application or function when the mobile device is in the above-lock state and the low-power state,
instructions to, responsive to receiving the first request, cause the mobile device to enter the active-power state and executing the requested application or function with the mobile device, wherein one or more functions of the requested application available in the below-lock state are unavailable while the mobile device is in the above-lock state,
instructions to receive a second request for one or more of the functions unavailable in the above-lock state, and
instructions to, responsive to the receiving the second request, present a lock screen that can be used to change the mobile device to the below-lock state.

22. The mobile device of claim 21, wherein at least one of the unavailable functions is made available in the below-lock state, and wherein the computer-readable storage devices or memory further comprise:
instructions to, based on receiving authenticating input, change the state of the mobile device from the above-lock state to the below-lock state.

23. The mobile device of claim 21, wherein the computer-readable storage devices or memory further comprise:
instructions to, if the mobile device does not detect user activity before a predetermined timeout period expires, transition the mobile device back to the above-lock state.

24. The mobile device of claim 21, wherein the computer-readable storage devices or memory further comprise:
instructions to receive the second request with a touch screen display.

25. The mobile device of claim 21, wherein the computer-readable storage devices or memory further comprise:

instructions to receive the second request via a voice recognition or voice recording application.

\* \* \* \* \*